(12) United States Patent
Kitai

(10) Patent No.: US 12,744,851 B2
(45) Date of Patent: Sep. 22, 2026

(54) PRINT INSPECTION APPARATUS, PRINT SYSTEM, PRINT INSPECTION METHOD, AND NON-TRANSITORY RECORDING MEDIUM

(71) Applicant: Tadashi Kitai, Kanagawa (JP)

(72) Inventor: Tadashi Kitai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 266 days.

(21) Appl. No.: 18/627,733

(22) Filed: Apr. 5, 2024

(65) Prior Publication Data

US 2024/0364820 A1 Oct. 31, 2024

(30) Foreign Application Priority Data

Apr. 25, 2023 (JP) ................................ 2023-071658

(51) Int. Cl.
*H04N 1/58* (2006.01)
*H04N 1/00* (2006.01)

(52) U.S. Cl.
CPC ..... *H04N 1/00045* (2013.01); *H04N 1/00029* (2013.01); *H04N 1/00411* (2013.01); *H04N 1/00726* (2013.01); *H04N 2201/0094* (2013.01)

(58) Field of Classification Search
CPC .................. H04N 1/00045; H04N 2201/0094
USPC ................................ 358/1.9, 1.18; 382/112
See application file for complete search history.

(56) References Cited

U.S. PATENT DOCUMENTS

2012/0162649 A1 6/2012 Ishizaki et al.
2014/0079293 A1 3/2014 Kitai et al.
2015/0269719 A1 9/2015 Kitai
2020/0301336 A1 * 9/2020 Tsuchiya ............. G03G 15/553

FOREIGN PATENT DOCUMENTS

JP 3998758 B2 * 10/2007
JP 2015-194484 A 11/2015
JP 2018-036279 A 3/2018
JP 2023014650 A * 1/2023

* cited by examiner

*Primary Examiner* — Jamares Q Washington
(74) *Attorney, Agent, or Firm* — XSENSUS LLP

(57) ABSTRACT

A print inspection apparatus include circuitry that generates a difference image based on a comparison between a read image obtained by reading printed matter printed by a printer and a reference image, and inspects a defect of the printed matter using the difference image, a plurality of size thresholds, and a plurality of density thresholds corresponding to each of the plurality of size thresholds.

17 Claims, 21 Drawing Sheets

1300

CUSTOM THRESHOLD SETTING

1301

| | SIZE THRESHOLD | 16 | 64 | 256 | 1024 | 4096 | CHANGE |
|---|---|---|---|---|---|---|---|
| THRESHOLD SET | Lv1 | 80 | 40 | 20 | 10 | 5 | |
| | Lv2 | 50 | 25 | 13 | 7 | 4 | |
| | Lv3 | 30 | 15 | 8 | 4 | 3 | |
| | Lv4 | 20 | 10 | 5 | 3 | 2 | |
| | Lv5 | 10 | 5 | 3 | 2 | 1 | |
| | CUSTOM 1 | | | | | | ○ |
| | CUSTOM 2 | | | | | | ○ |
| | TEST 3 | | | | | | ● |
| | | | | | | | ○ |

1303 1302

| SIZE THRESHOLD | 16 | 64 | 256 | 1024 | 4096 |
|---|---|---|---|---|---|
| TEST 3 | | | | | |

1304

INPUT ALL THRESHOLDS INDIVIDUALLY

INPUT AND SET ONE THRESHOLD DECREASE INTENSITY DEPENDING ON SIZE 1309

INPUT WITH Lv RANGE FROM 1 TO 5 2.3 1306 CLEAR REFLECT CHANGE 1308

1
10
20
100
DFE
110
111
112
113Y
113M
113C
113K
114
115
116
117
120
121
122
123
130
131

| PARAMETER | NOTE | INITIAL VALUE |
|---|---|---|
| JOB GENERATION SOURCE | DEF JOB, INTERNAL JOB | SET BY GENERATION SOURCE |
| GENERATION TIME | TIME AT WHICH GENERATION SOURCE HAS GENERATED JOB INFORMATION | SET BY GENERATION SOURCE |
| PAGE ID | IDENTIFICATION INFORMATION ON PRINT PAGE, +1 EACH TIME ONE PAGE IS OUTPUT SINCE POWER IS TURNED ON | 0 |
| PRINT SIDE | SIMPLEX, FRONT OF DUPLEX, BACK OF DUPLEX | SET BY GENERATION SOURCE |
| SHEET ID | IDENTIFICATION INFORMATION ON PRINT SHEET, +1 EACH TIME ONE SHEET IS OUTPUT SINCE POWER IS TURNED ON | 0 |
| PRINT ID | IDENTIFICATION INFORMATION ON PRINT BASIS, +1 EACH TIME OUTPUT OF ONE PRINT IS COMPLETED SINCE POWER IS TURNED ON | 0 |
| JOB ID | IDENTIFICATION INFORMATION ON JOB BASIS, +1 EACH TIME OUTPUT OF ONE JOB IS COMPLETED SINCE POWER IS TURNED ON | 0 |
| SHEET TYPE | TYPE OF SHEET | SET BY GENERATION SOURCE |
| SHEET SIZE | SIZE OF SHEET | SET BY GENERATION SOURCE |
| JOB TYPE | DEFECT DETECTION TARGET, NON-TARGET, LAMINATING PAPER FOR DEFECT DETECTION IDENTIFICATION, PRINTING OF TEST CHART FOR THRESHOLD ADJUSTMENT | SET BY GENERATION SOURCE |
| ... | ... | ... |

| | SIZE THRESHOLD | | | | | THRESHOLD SET |
|---|---|---|---|---|---|---|
| | 16 | 64 | 256 | 1024 | 4096 | |
| DENSITY THRESHOLD | 80 | 40 | 20 | 10 | 5 | Lv1 |
| | 50 | 25 | 13 | 7 | 4 | Lv2 |
| | 30 | 15 | 8 | 4 | 3 | Lv3 |
| | 20 | 10 | 5 | 3 | 2 | Lv4 |
| | 10 | 5 | 3 | 2 | 1 | Lv5 |
| | | | | | | CUSTOM 1 |
| | | | | | | CUSTOM 2 |
| | | | | | | ... |
| | | | | | | CUSTOM 10 |

PIXELS DETERMINED AS DEFECT WITH DENSITY THRESHOLD OF 50 IN Lv2
PIXELS DETERMINED AS DEFECT WITH DENSITY THRESHOLD OF 25 IN Lv2
DEFECT DETERMINATION RESULT WITH DENSITY THRESHOLD OF 50 IN Lv2
701
DEFECT DETERMINATION RESULT WITH DENSITY THRESHOLD OF 25 IN Lv2
702
OR OF DEFECT DETERMINATION RESULTS WITH DENSITY THRESHOLDS OF 50 AND 25 IN Lv2
703

EXAMPLE OF CONFIRMATION IMAGE WITH THRESHOLD SET Lv4

1210

1211

A B C D E F G 1 2 3 4 5 6 7

EXAMPLE OF CONFIRMATION IMAGE WITH THRESHOLD SET Lv2

| | SIZE THRESHOLD | | | | | THRESHOLD SET |
|---|---|---|---|---|---|---|
| | 4 | 8 | 16 | 32 | 64 | |
| DENSITY THRESHOLD | 80 | 40 | 20 | 10 | 5 | Lv1 |
| | 50 | 25 | 13 | 7 | 4 | Lv2 |
| | 30 | 15 | 8 | 4 | 3 | Lv3 |
| | 20 | 10 | 5 | 3 | 2 | Lv4 |
| | 10 | 5 | 3 | 2 | 1 | Lv5 |
| | | | | | | CUSTOM 1 |
| | | | | | | CUSTOM 2 |
| | | | | | | ... |
| | | | | | | CUSTOM 10 |

PRINT INSPECTION APPARATUS, PRINT SYSTEM, PRINT INSPECTION METHOD, AND NON-TRANSITORY RECORDING MEDIUM

CROSS-REFERENCE TO RELATED APPLICATION

This patent application is based on and claims priority pursuant to 35 U.S.C. § 119 (a) to Japanese Patent Application No. 2023-071658, filed on Apr. 25, 2023, in the Japan Patent Office, the entire disclosure of which is hereby incorporated by reference herein.

BACKGROUND

Technical Field

The present disclosure relates to a print inspection apparatus, a print system, a print inspection method, and a non-transitory recording medium.

Related Art

The background print inspection apparatus reads printed matter printed by a printer and inspects whether printing is normally performed based on the read result of the printed matter.

For example, the image inspection apparatus inspects a defect of the printed matter based on threshold information including a density difference threshold that is a threshold for the difference in density for pixels and an area threshold that is a threshold for the number of pixels for a group of pixels having differences in density exceeding the density difference threshold.

SUMMARY

Example embodiments include a print inspection apparatus including circuitry that generates a difference image based on a comparison between a read image obtained by reading printed matter printed by a printer and a reference image, and inspects a defect of the printed matter using the difference image, a plurality of size thresholds, and a plurality of density thresholds corresponding to each of the plurality of size thresholds.

Example embodiments include a print system including a printer to print an image on a print medium to output the printed matter, and a print inspection apparatus communicably connected with the printer. The print inspection apparatus includes: a reading device to read the printed matter into a read image; and circuitry that generates a difference image based on a comparison between the read image and a reference image, and inspects a defect of the printed matter using the difference image, a plurality of size thresholds, and a plurality of density thresholds corresponding to each of the plurality of size thresholds.

Example embodiments include a print inspection method including: generating a difference image based on a comparison between a read image obtained by reading printed matter printed by a printer and a reference image; and inspecting a defect of the printed matter using the difference image, a plurality of size thresholds, and a plurality of density thresholds corresponding to each of the plurality of size thresholds.

Example embodiments include a non-transitory recording medium storing a plurality of instructions which, when executed by one or more processors, causes the one or more processors to perform the print inspection method.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 1 is a diagram illustrating an example of a system configuration of a print system according to an embodiment of the present disclosure;

FIG. 4 is a table presenting an example of job information according to an embodiment of the present disclosure;

FIG. 6 is a table presenting an example of a dot-shaped defect detection threshold according to the first embodiment of the present disclosure;

FIG. 15 is a table presenting an example of a linear defect detection threshold according to the second embodiment of the present disclosure;

Figure 2:
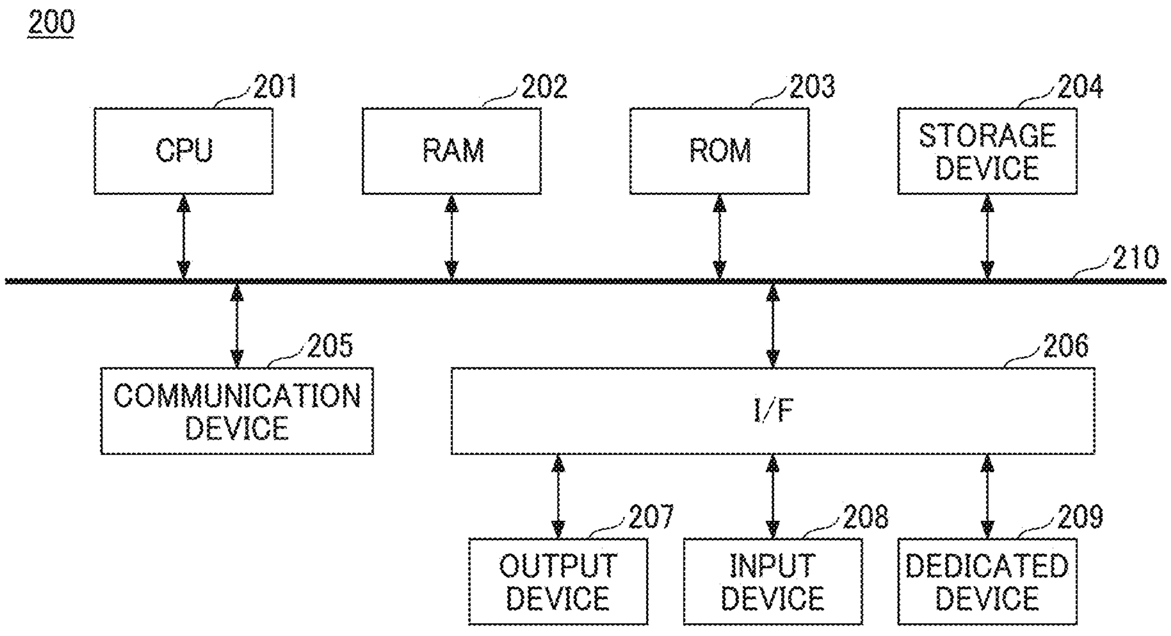
FIG. 2 is a block diagram illustrating an example of a hardware configuration of a computer according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a”, “an”, and “the” are intended to include the plural forms as well, unless the context clearly indicates otherwise.

Embodiments of the present disclosure are described below with reference to the drawings.

System Configuration

Figure 1:
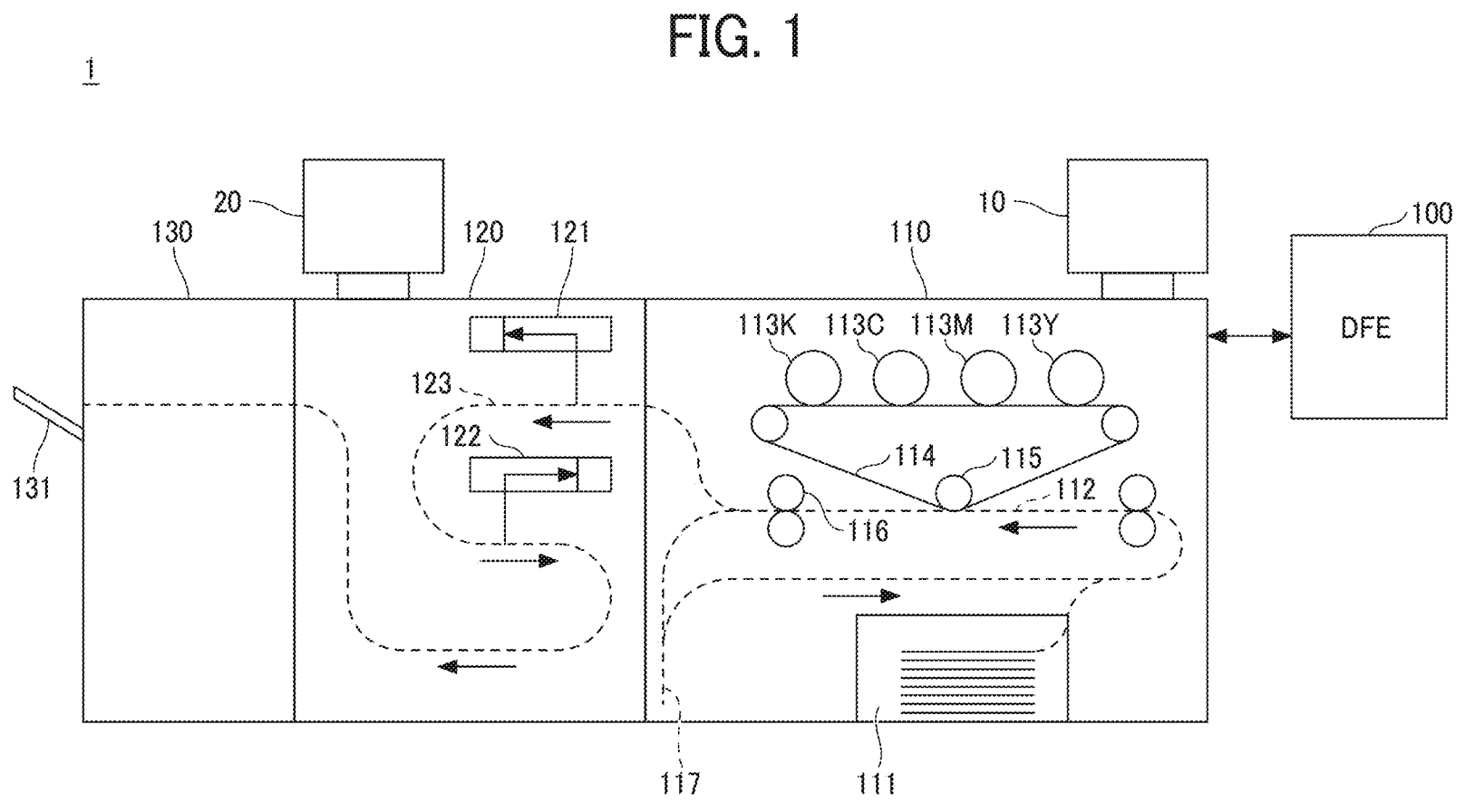

FIG. 1 is a diagram illustrating an example of a system configuration of a print system 1 according to an embodiment of the present disclosure. As illustrated in FIG. 1, the print system 1 includes, for example, a digital front end (DFE) 100, a printer 110, a print inspection apparatus 120, and a stacker 130.

The DFE 100 is an information processing apparatus that executes processing with a raster image processor (RIP) based on a received print job to generate print data to be printed, and outputs the generated print data and job information indicating processing content of the print job to the printer 110.

The printer 110 is an image forming apparatus that performs printing on a sheet, which is an example of a print medium, based on the print data and the job information received from the DFE 100. For example, the printer 110 acquires a sheet from a sheet feeder 111 and conveys the acquired sheet along a conveyance path 112. In the printer 110, photoconductor drums 113K, 113C, 113M, and 113Y of black (K), cyan (C), magenta (M), and yellow (Y) are arranged along a conveyance belt 114. The printer 110 superposes toner images of the respective colors on the conveyance belt 114 from the photoconductor drums 113K, 113C, 113M, and 113Y as a composite toner image, transfers the composite toner image onto the conveyed sheet using a roller 115, and fixes the composite toner image onto the sheet using rollers 116.

The printer 110 ejects the sheet directly to the print inspection apparatus 120 in the case of simplex printing. The printer 110 reverses the front and back sides of the sheet in a reverse path 117 and conveys the reversed sheet again along the conveyance path 112 in the case of duplex printing. Thus, the printer 110 transfers and fixes a toner image also onto the back side of the sheet similarly to the front side of the sheet, and then ejects the sheet to the print inspection apparatus 120.

The print inspection apparatus 120 is an inspection apparatus that inspects printed matter printed by the printer 110.

For example, the print inspection apparatus 120 uses reading devices 121 and 122, each implemented by a sensor, to read both sides of a sheet in a conveyance path 123 and generate read images. The print inspection apparatus 120 ejects the read sheet to the stacker 130. The stacker 130 stacks the sheet ejected from the print inspection apparatus 120 onto a tray 131.

In the example in FIG. 1, the printer 110 includes an operation panel 10, and the print inspection apparatus 120 includes an operation panel 20. The operation panels 10 and 20 are display input devices that display various display screens and receive input operations by a user.

However, without being limited to the operation panels 10 and 20, the print inspection apparatus 120 may omit the operation panel 20 and may cause the operation panel 10 of the printer 110 to display various display screens. Alternatively, the print inspection apparatus 120 may display various display screens on an information processing apparatus, such as a personal computer (PC) or the DFE 100, connected to the print inspection apparatus 120 via a communication network.

In the above-described system configuration, the print inspection apparatus 120 generates a difference image between a read image obtained by reading printed matter printed by the printer 110 and a reference image to be compared with the read image, and inspects a defect of the printed matter based on the generated difference image and an inspection threshold.

In the background technique, for example, as described in Japanese Unexamined Patent Application Publication No. 2015-194484, a defect of printed matter is inspected using the combination of the threshold relating to the density and the threshold relating to the size. However, there is a defect that is not detectable depending on the density or size of the defect. For example, the background technique cannot properly determine a defect for a print defect having a high density and a small size, and a print defect having a low density and a large size.

The print inspection apparatus 120 according to the present embodiment generates a difference image between a read image and a reference image, and inspects a defect of printed matter using the difference image, a plurality of size thresholds, and a plurality of density thresholds corresponding to each of the plurality of size thresholds. For example, the print inspection apparatus 120 further performs defect determination using the plurality of size thresholds on each of defective pixels determined as a defect using the plurality of density thresholds. The plurality of density thresholds are desirably set to vary each depending on the size threshold.

Thus, according to the present embodiment, the print inspection apparatus 120 that inspects a defect of printed matter printed by the printer 110 can reduce defects that are not detectable. For example, the print inspection apparatus 120 according to the present embodiment can more properly determine a defect for a print defect having a high density and a small size, and a print defect having a low density and a large size.

Hardware Configuration

The printer 110 and the print inspection apparatus 120 each have, for example, a controller 200 having a hardware configuration substantially similar to that of a computer, which is additionally provided with a dedicated device 209, as illustrated in FIG. 2.

FIG. 2 is a block diagram illustrating an example hardware configuration of the controller 200 according to an embodiment of the present disclosure. The controller 200 includes, for example, a central processing unit (CPU) 201, a random access memory (RAM) 202, a read only memory (ROM) 203, a storage device 204, a communication device 205, and an interface (I/F) 206, which are connected with one another via a bus 210. The I/F 206 is connected to, for example, an output device 207, an input device 208, and the dedicated device 209.

The CPU 201 is, for example, a processor that controls the entirety of the printer 110 or the print inspection apparatus 120 by executing a predetermined program stored in a storage medium such as the storage device 204 or the ROM 203. The RAM 202 is, for example, a volatile memory that is used as a work area of the CPU 201. The ROM 203 is, for example, a non-volatile memory that stores a program for activating the CPU 201. The storage device 204 is, for example, a non-volatile large-capacity storage device, such as a hard disk, which stores an operating system (OS), an application, data, or information.

The communication device 205 includes various wired or wireless communication interface circuits for communication with another device or apparatus. The I/F 206 is an interface circuit for connecting various pieces of hardware to the bus 210. In the example in FIG. 2, the output device 207, the input device 208, the dedicated device 209, etc. are connected to the I/F 206.

The output device 207 includes various devices (for example, a display, a speaker, or a light-emitting element) that perform output to the outside. The input device 208 includes various devices (for example, a touch panel, a keyboard, a pointing device, a microphone, a switch, or a button) that receive input from the outside. Alternatively, the output device 207 and the input device 208 may be, for example, an input/output device such as the operation panel 10 or 20.

The dedicated device 209 is hardware for implementing a dedicated function in each of the printer 110 and the print inspection apparatus 120. For example, a dedicated device 209 including a print device that performs printing on a sheet and a conveyance mechanism that conveys a sheet is connected to the printer 110. Moreover, a dedicated device 209 including the reading devices 121 and 122 that read printed matter printed by the printer 110 and that are implemented by sensors is connected to the print inspection apparatus 120. Furthermore, a dedicated device 209 that increases the speed of image processing, for example, an application specific integrated circuit (ASIC) or a graphics processing unit (GPU) may be connected to the print inspection apparatus 120. At least part of the dedicated devices 209 may be connected to the bus 210 without using the I/F 206.

Hardware Configurations of DFE and Stacker

In the present embodiment, the DFE 100 and the stacker 130 may have a hardware configuration substantially similar to the hardware configuration of FIG. 2. For example, the DFE 100 may be implemented by a server, which includes all hardware structures illustrated in FIG. 2, except for the dedicated device 209.

Functional Configuration

Figure 3:
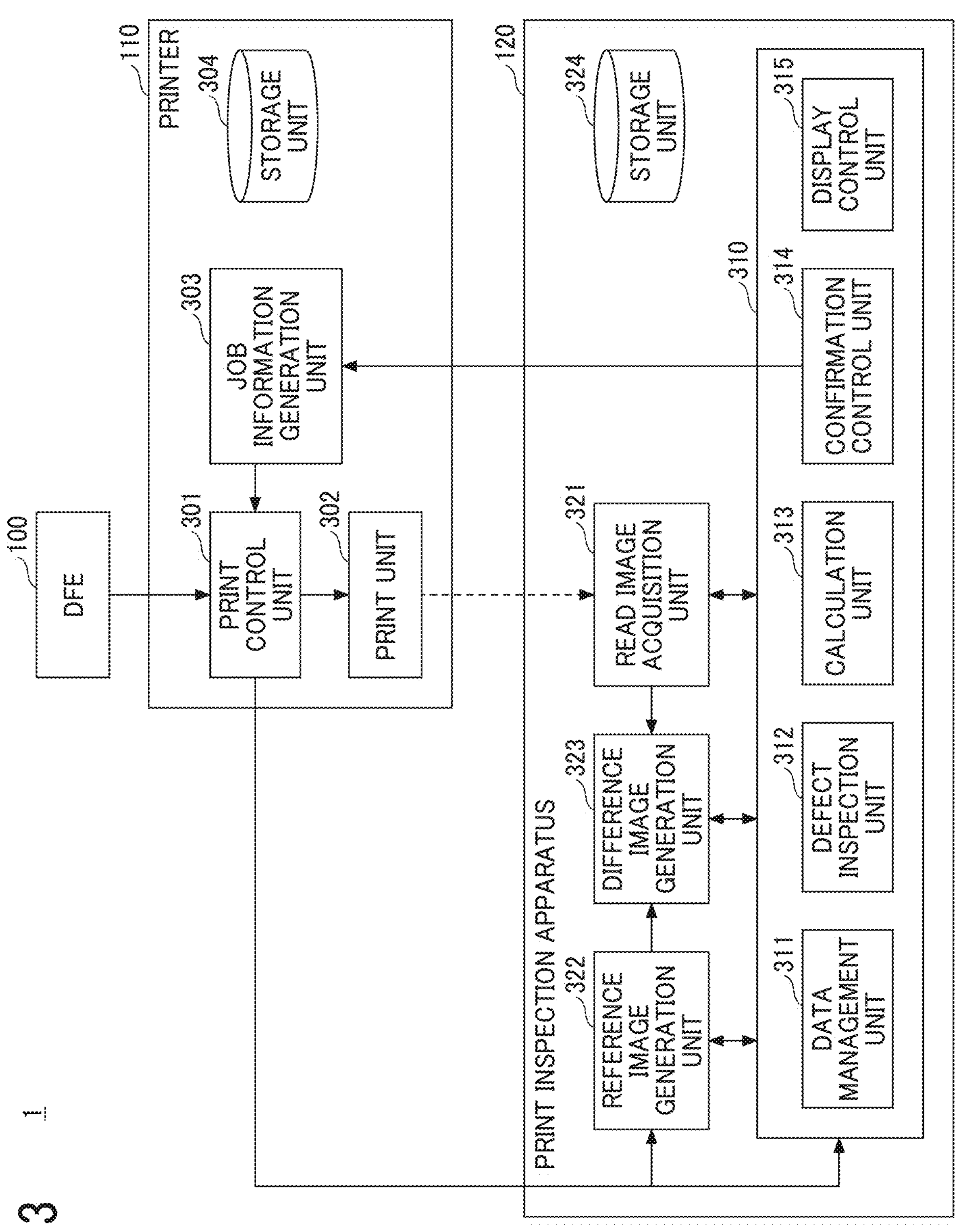
FIG. 3 is a diagram illustrating an example of a functional configuration of the print system according to an embodiment of the present disclosure.

FIG. 3 is a diagram illustrating an example of a functional configuration of the print system according to an embodiment of the present disclosure.

Functional Configuration of Printer

The printer 110 includes, for example, a print control unit 301, a print unit 302, a job information generation unit 303, and a storage unit 304.

The print control unit 301 is implemented by, for example, a program that is executed by the CPU 201 of the printer 110. The print control unit 301 executes, for example, a first print control process of causing the print unit 302 to execute a print process based on a first print job (print data and job information) received from the DFE 100. When receiving a second print job for printing a test chart from the job information generation unit 303, the print control unit 301 executes a second print control process of causing the print unit 302 to execute a print process based on the second print job. The print control unit 301 transmits print data (RIP image), job information, and so forth to the print inspection apparatus 120 when causing the print unit 302 to execute a print process.

FIG. 4 is a table presenting an example of job information 400 according to an embodiment of the present disclosure. As presented in FIG. 4, the job information 400 includes, for example, parameters such as "job generation source", "generation time", "page ID", "print side", "sheet ID", "print ID", "job ID", "sheet type", "sheet size", and "job type".

The "job generation source" is information indicating a generation source of a print job. "DFE job" indicates that the generation source of the job is the DFE 100. "Internal job" indicates that the generation source of the job is the job information generation unit 303 or the like. The "generation time" is information indicating the time at which the generation source has generated the job information 400. The "page ID" is an identification number for identifying a print image. For example, 1 is added each time one page is output since the power is turned on. The "print side" is information for identifying whether a print image is for simplex printing, printing on the front side of duplex printing (front of duplex), or printing on the back side of duplex printing (back of duplex).

The "sheet ID" is identification information for identifying a sheet. For example, in the case of duplex printing, the same sheet ID is assigned to two pages to be printed on the same sheet. For example, 1 is added to the "sheet ID" each time one sheet is processed since the power is turned on. The "print ID" is identification information for identifying a particular print (print basis), and, for example, 1 is added each time output of one print (that is, printing of one or more sheets as a set) is completed since the power is turned on. The "job ID" is identification information for identifying a print job. For example, 1 is added each time output of one print job is completed since the power is turned on.

The "sheet type" is information indicating the type of a sheet. The "sheet size" is information indicating the size of a sheet. The "job type" is, for example, information indicating whether a print job is normal printing or printing of a test chart. For example, when a test chart for threshold adjustment is printed, a print job is generated by the job information generation unit 303 instead of the DFE 100. In this case, the "job type" is set to "printing of test chart for threshold adjustment".

The job information 400 is generated, for example, for each page of print data, and is managed together with the print data. The printer 110 prints each print data based on the job information 400.

Referring back to FIG. 3, the description of the functional configuration of the printer 110 is continued. The print unit 302 is implemented by, for example, a program that is executed by the CPU 201 of the printer 110, and the dedicated device 209 (the print device, the conveyance mechanism, and so forth) that is connected to the I/F 206 of the printer 110. The print unit 302 executes a print process of printing printed matter based on an instruction from the print control unit 301 and print data. The print unit 302 outputs the print matter, such as a printed sheet, to the print inspection apparatus 120.

The job information generation unit 303 is implemented by, for example, a program that is executed by the CPU 201 of the printer 110. The job information generation unit 303 generates a print job for printing a test chart including a test pattern for threshold adjustment, and outputs the generated print job to the print control unit 301, for example, in accordance with an instruction from the print inspection apparatus 120. The print data of the test chart is stored in advance in, for example, the storage unit 304.

The storage unit 304 is implemented by, for example, a program that is executed by the CPU 201 of the printer 110, the storage device 204, and the RAM 202. The storage unit 304 stores, for example, various print data including the above-described print data for the test chart, job information, and setting information. The storage unit 304 is accessible from each functional configuration in the printer 110. Alternatively, the storage unit 304 may be provided outside the printer 110.

Functional Configuration of Print Inspection Apparatus

The print inspection apparatus 120 includes, for example, a read image acquisition unit 321, a reference image generation unit 322, a difference image generation unit 323, a system control unit 310, and a storage unit 324.

The read image acquisition unit 321 is implemented by, for example, a program that is executed by the CPU 201 of the print inspection apparatus 120, the reading devices 121 and 122 that are connected to the I/F 206, and an ASIC. The read image acquisition unit 321 executes a read image acquisition process of acquiring a read image obtained by reading printed matter printed by the printer 110.

The reference image generation unit 322 is implemented by, for example, a program that is executed by the CPU 201 of the print inspection apparatus 120, and an ASIC that is connected to the I/F 206. The reference image generation unit 322 executes a reference image generation process of generating a reference image to be compared with the read image, based on print data, job information 400, and so forth transmitted from the print control unit 301 of the printer 110.

The difference image generation unit 323 is implemented by, for example, a program that is executed by the CPU 201 of the print inspection apparatus 120, and an ASIC that is connected to the I/F 206. The difference image generation unit 323 executes a difference image generation process of generating a difference image representing the difference between the reference image generated by the reference image generation unit 322 and the read image acquired by the read image acquisition unit 321. The read image, the reference image, and the difference image are, for example, red, green, and blue (RGB) images.

The system control unit 310 is implemented by, for example, a program that is executed by the CPU 201 of the print inspection apparatus 120. The system control unit 310 includes, for example, a data management unit 311, a defect inspection unit 312, a calculation unit 313, a confirmation control unit 314, and a display control unit 315.

The data management unit 311 receives print data (RIP image) and job information from the printer 110, and executes a data management process of storing and managing the received data and information in the storage unit 324. The data management unit 311 transfers information to be used to the read image acquisition unit 321, the reference image generation unit 322, the difference image generation unit 323, the defect inspection unit 312, the calculation unit 313, the stacker 130, and so forth.

The defect inspection unit 312 executes a defect inspection process of inspecting a defect of printed matter using the difference image generated by the difference image generation unit 323, a plurality of size thresholds, and a plurality of density thresholds (thresholds for density difference) corresponding to each of the plurality of size thresholds.

The print inspection apparatus 120 stores a plurality of threshold sets each including a combination of the plurality of size thresholds and the plurality of density thresholds, in the storage unit 324 or the like. The defect inspection unit 312 inspects a defect of printed matter using a threshold set selected by the user from the plurality of threshold sets. For example, the defect inspection unit 312 further performs defect determination using the plurality of size thresholds on each of defects determined using the plurality of density thresholds included in the threshold set. An example of the defect inspection process that is executed by the defect inspection unit 312 is described later.

The calculation unit 313 executes a calculation process of calculating, based on a density threshold corresponding to one size threshold set by the user, a density threshold corresponding to another size threshold among the plurality of density thresholds. An example of the calculation process that is executed by the calculation unit 313 is described later.

The confirmation control unit 314 executes a confirmation control process of performing control when a threshold is applied to a test chart. For example, the confirmation control unit 314 controls printing of a test chart including a plurality of defects, and generates a confirmation image for confirming a defect that is determined using one threshold set selected by the user among a plurality of defects. An example of the confirmation control process that is executed by the confirmation control unit 314 is described later.

The display control unit 315 is implemented by, for example, a program that is executed by the CPU 201 of the print inspection apparatus 120, and executes a display control process of causing a display unit of the operation panel 10, the operation panel 20, or an external information processing apparatus to display various display screens. For example, the display control unit 315 causes the display unit to display a user interface (UI) screen (confirmation screen) for selecting the one threshold set from the plurality of threshold sets. The display control unit 315 also causes the display unit to display a setting screen for setting a threshold set. An example of the display screen caused to be displayed by the display control unit 315 is described later.

The storage unit 324 is implemented by, for example, a program that is executed by the CPU 201 of the print inspection apparatus 120, the storage device 204, and the RAM 202. The storage unit 324 is accessible from each functional configuration included in the print inspection apparatus 120, and stores, for example, various information and data including the print data and the job information 400 received from the printer 110, and the plurality of threshold sets.

The functional configuration of the print system 1 illustrated in FIG. 3 is an example. For example, referring to FIG. 3, the job information generation unit 303 included in the printer 110 may be included in the print inspection apparatus 120. In this case, the job information generation unit 303 of the print inspection apparatus 120 transmits a print job of a test chart to the print control unit 301 of the printer 110 in a manner similar to the DFE 100. Thus, the print system 1 according to the present embodiment may be implemented by using the existing printer 110 not including the job information generation unit 303.

Flow of Processing

A flow of processing of a print inspection method according to the present embodiment is described next.

First Embodiment

Figure 5:
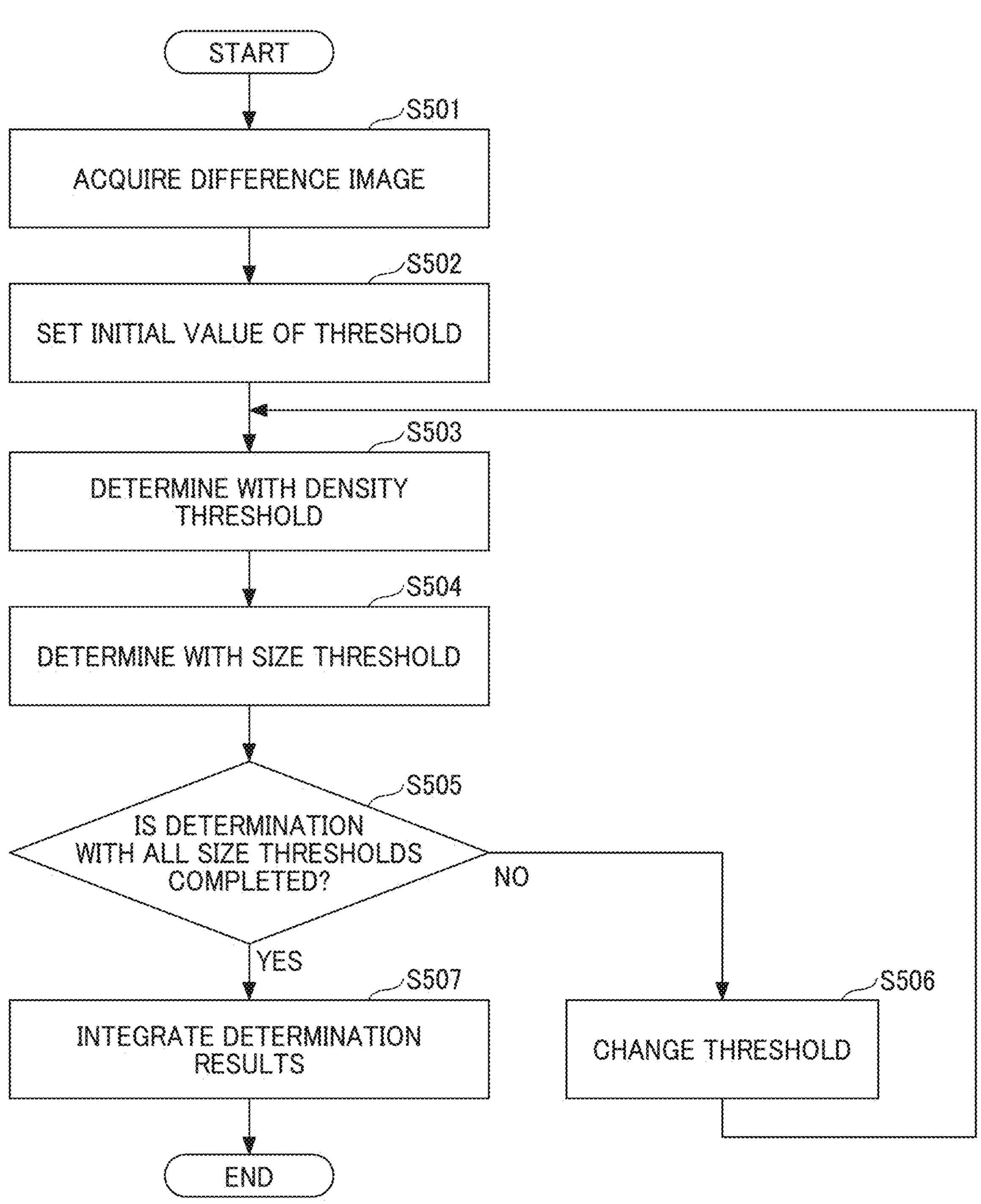
FIG. 5 is a flowchart presenting an example of a defect determination process according to a first embodiment of the present disclosure.

FIG. 5 is a flowchart presenting an example of a defect determination process according to a first embodiment of the present disclosure. This process represents an example of a defect determination process in which the print inspection apparatus 120 having the functional configuration described with reference to FIG. 3 reads printed matter printed by the printer 110 and determines a defect of the print based on the read result.

In step S501, the system control unit 310 of the print inspection apparatus 120 acquires a difference image from printed matter printed by the printer 110. For example, the read image acquisition unit 321 acquires a read image obtained by reading printed matter printed by the printer 110. The reference image generation unit 322 generates a reference image to be compared with the read image based on print data, job information 400, and so forth transmitted from the printer 110. The difference image generation unit 323 generates a difference image between the read image acquired by the read image acquisition unit 321 and the reference image generated by the reference image generation unit 322. The system control unit 310 stores the difference image generated by the difference image generation unit 323 in the storage unit 324 or the like.

In step S502, the defect inspection unit 312 of the system control unit 310 sets an initial value of a threshold for defect determination. The print inspection apparatus 120 according to the present embodiment stores, for example, a dot-shaped defect detection threshold 600 as presented in FIG. 6 in advance in the storage unit 324 or the like.

FIG. 6 is a table presenting an example of the dot-shaped defect detection threshold 600 according to the first embodiment of the present disclosure. In the example in FIG. 6, the dot-shaped defect detection threshold 600 includes a plurality of threshold sets 601. The plurality of threshold sets 601 include, for example, preset threshold sets (Lv1 to Lv5) and a plurality of threshold sets (custom 1 to custom 10) that can be set by the user. Each threshold set includes a plurality of size thresholds (16, 64, 256, . . . ) and a plurality of density thresholds corresponding to each of the plurality of size thresholds. For example, in the threshold set Lv2, a size threshold of "16" corresponds to a density threshold of "50", and a size threshold of "64" corresponds to a density threshold of "25".

The density threshold is a threshold for the density difference, and is a threshold that is compared with the RGB values of the difference image. The size threshold is a threshold for the number of defective pixels determined as a defect using the density threshold. For example, in the case of the threshold set Lv2, when the number of pixels (size) of a group of adjacent pixels having a density difference of 50 or more is equal to or greater than a size threshold of 16 pixels in the acquired difference image, the group of adjacent pixels is determined as a defect. Similarly, when the number of pixels of a group of adjacent pixels having a density difference of 20 or more is equal to or greater than a size threshold of 25 pixels in the acquired difference image, the group of adjacent pixels is determined as a defect.

For example, when the user has set the threshold set Lv2, in step S502, the defect inspection unit 312 sets the size threshold of "16" and the density threshold of "50" as initial values of the thresholds for defect determination.

In step S503, the defect inspection unit 312 performs determination (defect determination) with a density threshold on the difference image. For example, the defect inspection unit 312 generates a binary image indicating "1" when any one of the RGB values of each pixel of the difference image is equal to or greater than the density threshold, and generates a binary image indicating "0" when all RGB values of each pixel of the difference image are smaller than the density threshold.

In step S504, the defect inspection unit 312 performs determination (defect determination) with a size threshold on the generated binary image. For example, the defect inspection unit 312 performs a labeling process on the generated binary image to set adjacent pixels having a pixel value of "1" as an object. When the size of the object (the number of pixels having the pixel value of "1" included in the object) is equal to or greater than the size threshold, the defect inspection unit 312 determines the object (or the pixels having the pixel value of "1" included in the object) as a defect.

In step S505, the defect inspection unit 312 determines whether the determination with all size thresholds is completed. For example, the defect inspection unit 312 determines whether the processing in steps S503 and S504 has been executed with all size thresholds of "16", "64", "256", "1024", and "4096" in the dot-shaped defect detection threshold 600 as presented in FIG. 6. When the determination with all size thresholds is not completed, the defect inspection unit 312 advances the processing to step S506. In contrast, when the determination with all size thresholds is completed, the defect inspection unit 312 advances the processing to step S507.

In step S506, the defect inspection unit 312 changes the threshold. For example, the defect inspection unit 312 changes the size threshold to a next greater threshold, and sets a threshold for the density difference corresponding to the changed size threshold. For example, when the threshold set Lv2 in FIG. 6 is set, the size threshold next to the size threshold of "16" is "64", and the density threshold next to the density threshold of "50" is "25". After the defect inspection unit 312 changes the threshold, the defect inspection unit 312 returns the processing to step S503.

In step S507, the defect inspection unit 312 integrates the determination results of the defect determination in the processing from step S503 to step S506. For example, the defect inspection unit 312 determines the sum of defective areas of the determination results as a final defective area.

Figure 7:
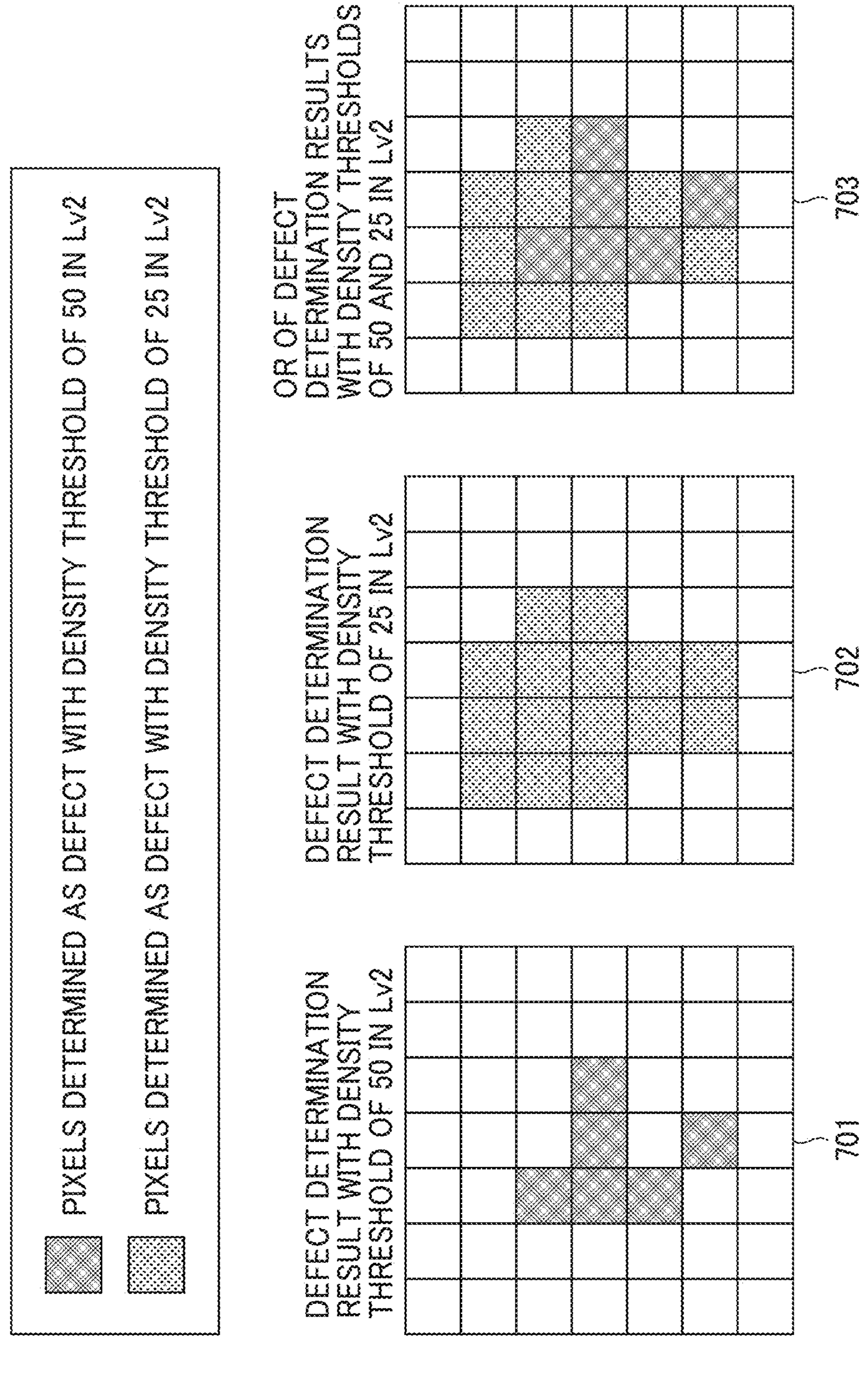
FIG. 7 is a diagram illustrating integration of determination results according to the first embodiment of the present disclosure.

FIG. 7 is a diagram illustrating integration of determination results according to the first embodiment of the present disclosure. For example, it is assumed that a defect determination result 701 with the density threshold of 50 in the threshold set Lv2 in FIG. 6 and a defect determination result 702 with the density threshold of 25 in the threshold set Lv2 are integrated. In this case, the defect inspection unit 312 uses an OR (sum) 703 of the defect determination result 701 with the density threshold of 50 in the threshold set Lv2 and the defect determination result 702 with the density threshold of 25 in the threshold set Lv2 as an integrated result.

Figure 8:
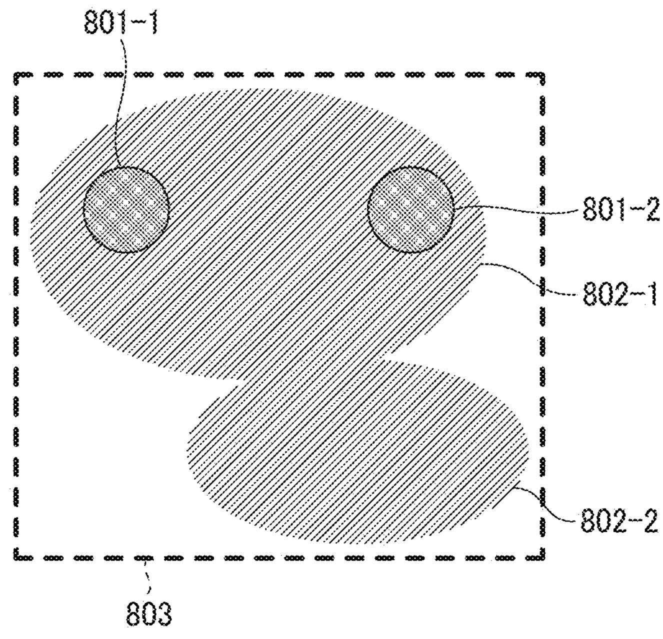
FIG. 8 is another diagram illustrating integration of determination results according to the first embodiment of the present disclosure.

FIG. 8 is another diagram illustrating integration of determination results according to the first embodiment of the present disclosure. For example, it is assumed that determination results 801-1 and 801-2 with the size threshold of 16 in the threshold set Lv2 in FIG. 6 and determination results 802-1 and 802-2 with the size threshold of 64 in the threshold set Lv2 are integrated. In this case, the defect inspection unit 312 obtains a rectangle 803 that circumscribes the OR (sum) of the determination results 801-1 and

801-2 with the size threshold of 16 in the threshold set Lv2 and the determination results 802-1 and 802-2 with the size threshold of 64 in the threshold set Lv2, as an integrated result.

As described above, the defect inspection unit 312 inspects a defective area of printed matter based on the sum of defective pixels determined as defects from the difference image using the plurality of density thresholds and the plurality of size thresholds. Thus, according to the present embodiment, the print inspection apparatus 120 that inspects a defect of printed matter printed by the printer 110 can reduce defects that are not detectable. For example, the print inspection apparatus 120 can more properly determine a print defect having a high density and a small size and a print defect having a low density and a large size.

Threshold Confirmation Screen

Figure 9:
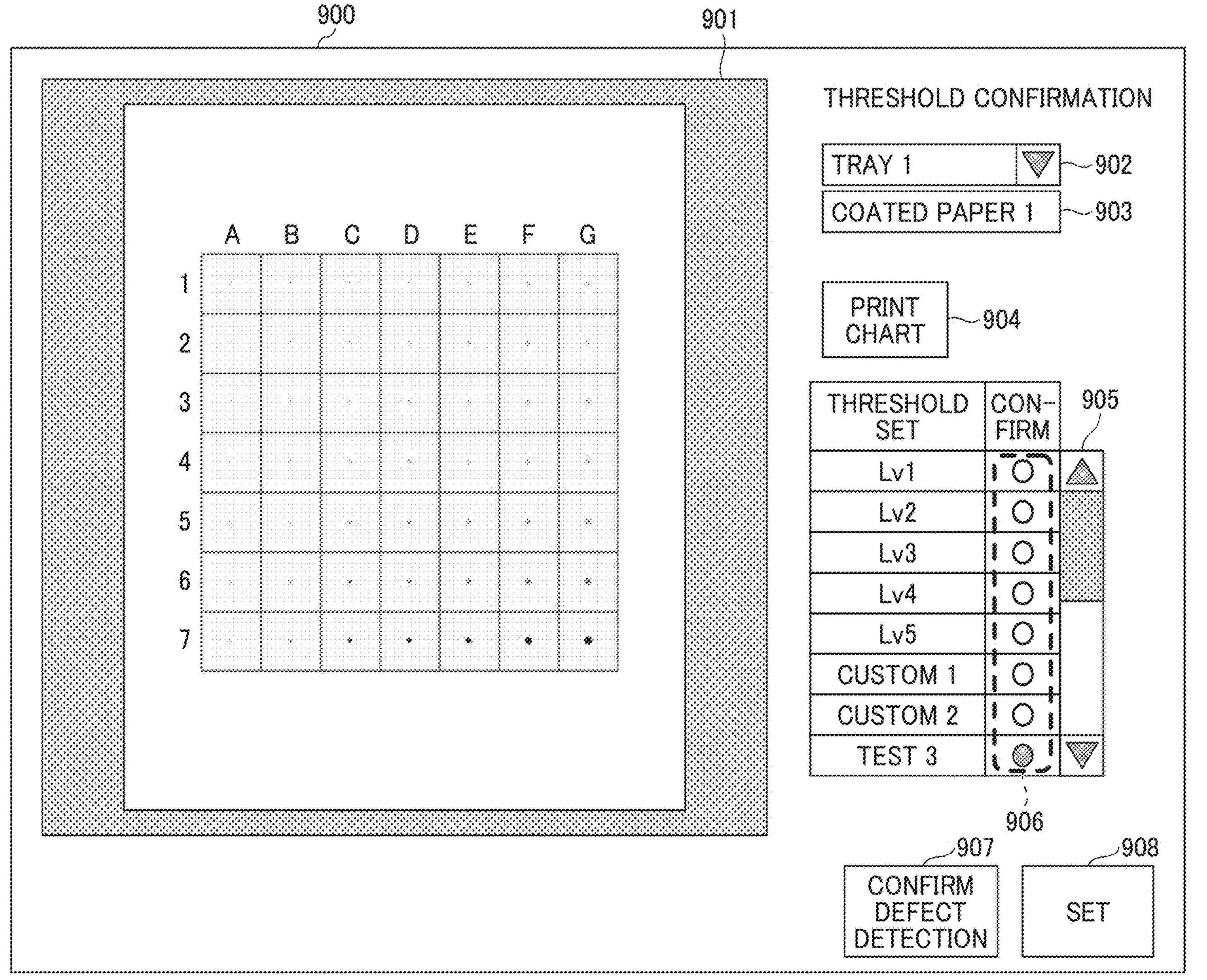
FIG. 9 is a view illustrating an example of a threshold confirmation screen according to the first embodiment of the present disclosure.

FIG. 9 is a view illustrating an example of a threshold confirmation screen 900 according to the first embodiment of the present disclosure. Using the threshold confirmation screen 900, the user can print a test chart including a plurality of defects, and display a confirmation image for confirming a defect that is determined using one threshold set selected by the user among the plurality of defects.

For example, a confirmation screen 901 for displaying a confirmation image, a selection field 902 for selecting a sheet tray for printing, a display field 903 for displaying sheets set in the selected sheet tray, and a "print chart" button 904 are displayed on the threshold confirmation screen 900. The user sets sheets in the selection field 902 and selects the "print chart" button 904 to print a test chart.

Figure 10:
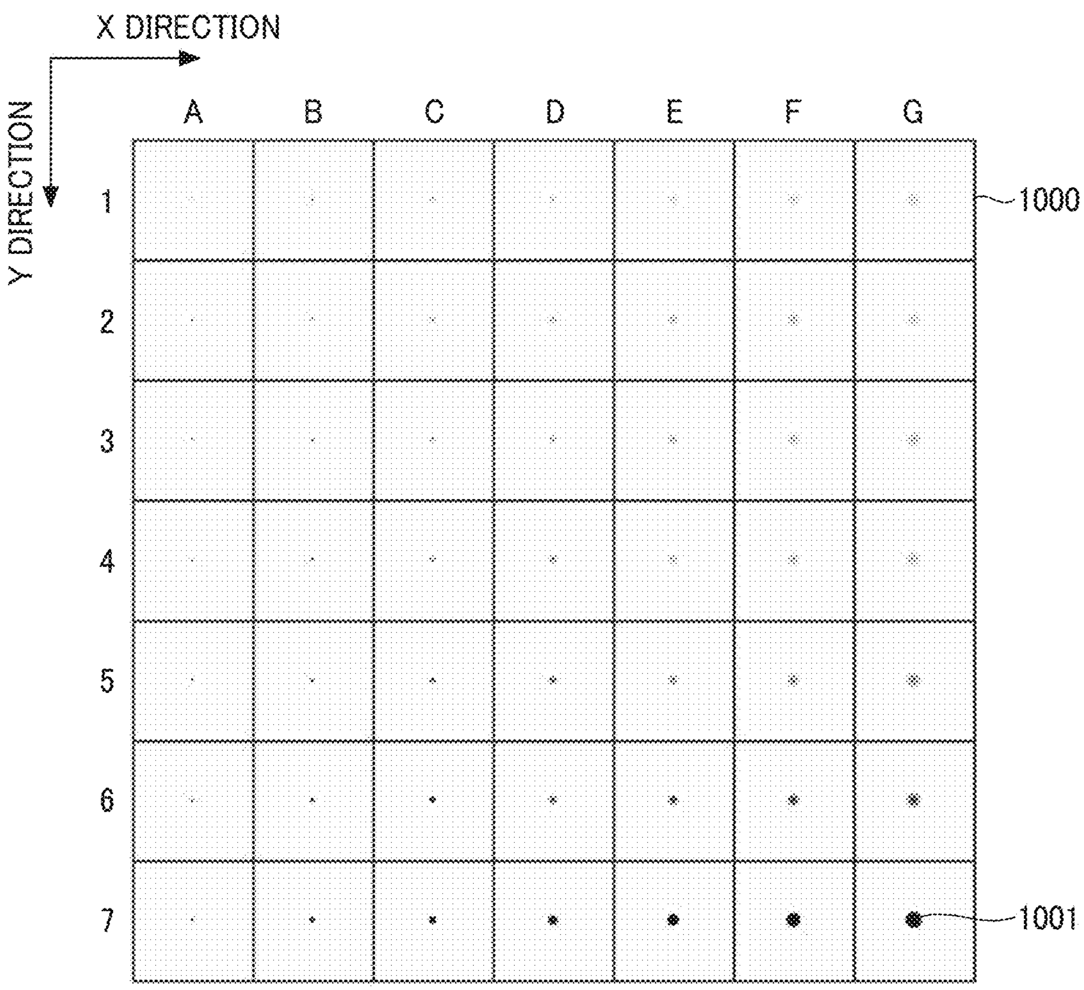
FIG. 10 is a diagram illustrating an example of a dot-shaped defect test chart according to the first embodiment of the present disclosure.

FIG. 10 is a diagram illustrating an example of a dot-shaped defect test chart 1000 according to the first embodiment of the present disclosure. The test chart 1000 is an image with a predetermined pattern, and includes, for example, a plurality of defects 1001 arranged in an XY plane as illustrated in FIG. 10. The plurality of defects are arranged so that the size or density of the defects varies in the X direction and the Y direction of the XY plane.

Referring to FIG. 10, 7×7 frames, numerals of 1 to 7, and characters of A to F represent document data, and circles within the 7×7 frames represent the defects 1001. In the example in FIG. 10, the plurality of defects 1001 are arranged so that the area of the defect 1001 increases as the position advances in the X direction, and the density of the defect 1001 increases as the position advances in the Y direction.

When the "print chart" button 904 is selected, the confirmation control unit 314 generates a difference image using a master image generated from an image including frames without a defect and a read image obtained by reading printed matter obtained by printing the test chart 1000 with the defects added, and performs defect determination.

Referring back to FIG. 9, the description of the threshold confirmation screen 900 is continued. For example, a scroll bar 905 for scrolling a list of threshold sets, and a radio button 906 for selecting a threshold set are also displayed on the threshold confirmation screen 900. The user can select one threshold set from the plurality of threshold sets using the scroll bar 905 and the radio button 906. The scroll bar 905 and the radio button 906 are examples of a selection field for selecting a threshold set. The selection field for selecting the threshold set may be provided by, for example, another selection method such as a drop-down list.

For example, a "confirm defect detection" button 907 and a "set" button 908 are further displayed on the threshold confirmation screen 900. When the "confirm defect detection" button 907 is selected, the confirmation control unit 314 displays, on the confirmation screen 901, a confirmation image for confirming a defect that is determined using the one threshold set selected by the user among the plurality of defects of the test chart. When the "set" button 908 is selected, the confirmation control unit 314 sets the selected one threshold set in the print inspection apparatus 120.

Figure 11:
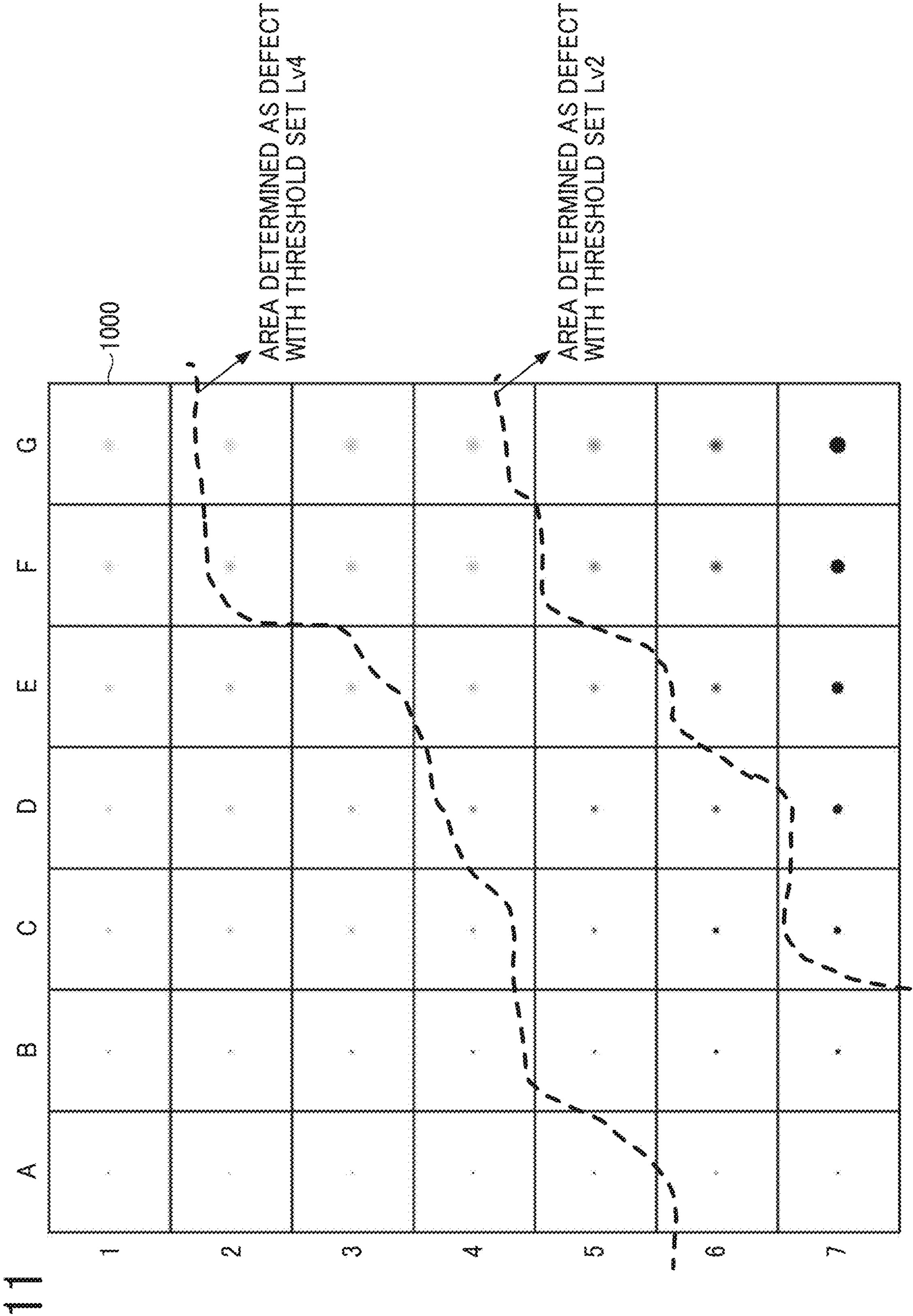
FIG. 11 is a diagram illustrating an image of a change in defect determination result according to the first embodiment of the present disclosure.

FIG. 11 is a diagram illustrating an image of a change in defect determination result according to the first embodiment of the present disclosure. As illustrated in FIG. 11, in the test chart 1000, for example, an area determined as a defect using the threshold set Lv4 in FIG. 6 is wider toward the upper left than an area determined as a defect using the threshold set Lv2 in FIG. 6.

Figures 12A, 12B:
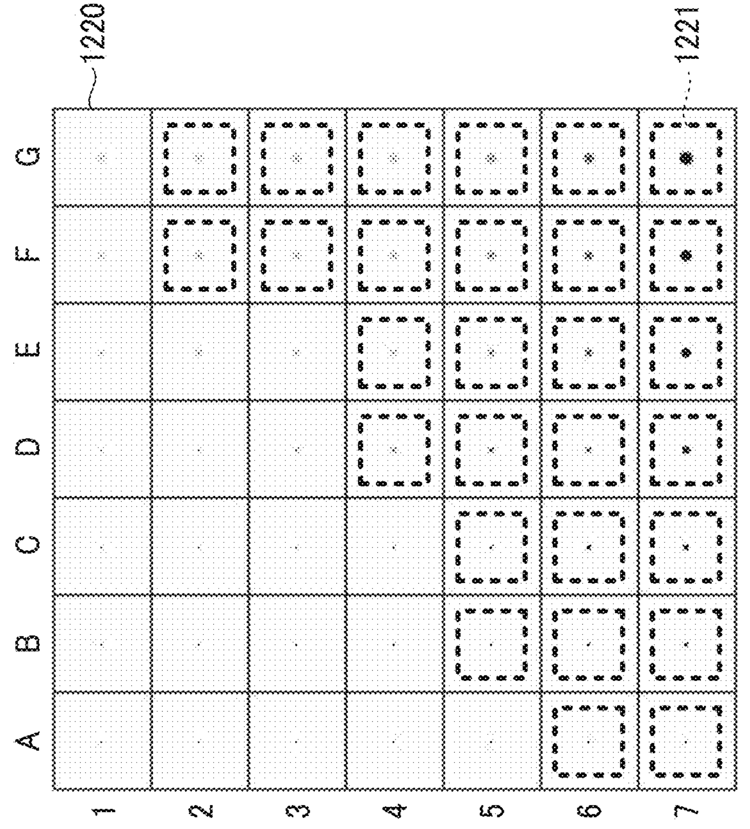
FIGS. 12A and 12B are diagrams illustrating examples of a confirmation image according to the first embodiment of the present disclosure.

FIGS. 12A and 12B are diagrams illustrating examples of a confirmation image according to the first embodiment of the present disclosure. When the "confirm defect detection" button 907 is selected, the display control unit 315 displays, on the confirmation screen 901, a confirmation image for confirming a defect that is determined using the one threshold set selected by the user among the plurality of defects of the test chart.

For example, when the user selects the threshold set Lv2, the display control unit 315 displays a confirmation image 1210 based on the threshold set Lv2 on the confirmation screen 901 as illustrated in FIG. 12A. In the example in FIG. 12A, the display control unit 315 displays a display element 1211 indicating determination as a defect around a defect determined using the threshold set Lv2 in the confirmation image 1210.

In this state, when the user selects the threshold set Lv4, the display control unit 315 displays a confirmation image 1220 based on the threshold set Lv4 on the confirmation screen 901 as illustrated in FIG. 12B. In the example in FIG. 12B, the display control unit 315 displays a display element 1221 indicating determination as a defect around a defect determined using the threshold set Lv4 in the confirmation image 1220.

As described above, with the threshold confirmation screen 900, the user can easily select the one threshold set from among the plurality of threshold sets.

Custom Threshold Setting Screen

Figure 13:
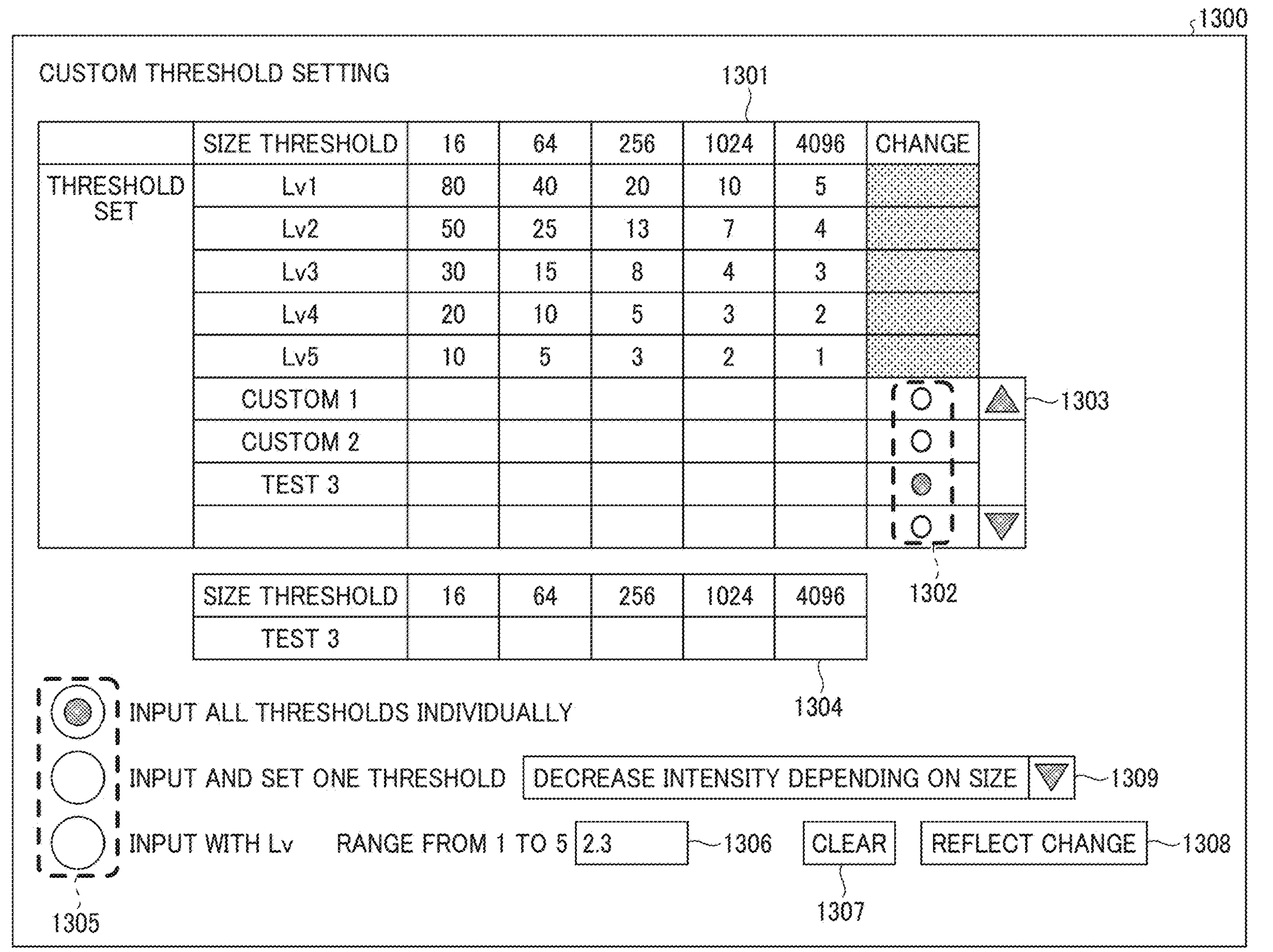
FIG. 13 is a view illustrating an example of a custom threshold setting screen according to the first embodiment of the present disclosure.

FIG. 13 is a view illustrating an example of a custom threshold setting screen 1300 according to the first embodiment of the present disclosure. Using the custom threshold setting screen 1300, the user can set a custom threshold set.

For example, a table 1301 that displays a list of threshold sets, which have been set, a radio button 1302 for selecting a threshold set to be changed, and a scroll bar 1303 are displayed on the custom threshold setting screen 1300. The display control unit 315 displays the table 1301 including the list of threshold sets, which have been set, based on the dot-shaped defect detection threshold 600 as presented in FIG. 6 stored in the storage unit 324. The radio button 1302 and the scroll bar 1303 are examples of a selection field for selecting a threshold set to be changed.

For example, a table 1304 for inputting and displaying a threshold to be changed, a selection field 1305 for selecting a method of generating a threshold, and an input field 1306 for a level are also displayed on the custom threshold setting screen 1300. For example, a "clear" button 1307 and a "reflect change" button 1308 are further displayed on the custom threshold setting screen 1300. The table 1304 is an example of an input field for inputting the plurality of density thresholds corresponding to each of the plurality of size thresholds.

For example, the user selects a display range using the scroll bar 1303, and selects a threshold set to be changed using the radio button 1302. Then, the user selects a method of generating a threshold from the selection field 1305.

When the user selects "input all thresholds individually" as the method of generating a threshold, the user inputs a plurality of density thresholds corresponding to each of a plurality of size thresholds (area thresholds) to the table 1301.

When the user selects "input and set one threshold" as the method of generating a threshold, the user inputs a threshold in a position in the table 1301. In response to this, the calculation unit 313 of the print inspection apparatus 120 calculates another threshold, and automatically calculates and displays the other threshold in the table 1301. For example, the calculation unit 313 calculates the other threshold using a predetermined function, such as a polynomial or a logarithmic function.

It is desired that the user can select a function to be used for calculating a threshold using a drop-down list 1309. The function may vary depending on the type of defect (for example, a dot-shaped defect or a linear defect).

For example, it is assumed that the user selects "decrease intensity depending on size" from the drop-down list 1309. When the type of defect is a dot-shaped defect, the calculation unit 313 may calculate the other threshold using, for example, Equation (1) below.

$$Y = V * 4/(\sqrt{X}) + 5 \quad (1)$$

In the equation, reference character X represents a size threshold, reference character Y represents a density threshold, and reference character V represents an input value (a threshold input by the user).

When the type of defect is a linear defect, the calculation unit 313 may calculate the other threshold using, for example, Equation (2) below.

$$Y = V * 4/X + 5 \quad (2)$$

Equation (1) and Equation (2) are examples, and the calculation unit 313 may calculate the other threshold using another function.

When the user selects, for example, "constant density regardless of size" from the drop-down list 1309, the calculation unit 313 calculates the other threshold using Equation (3) below regardless of the type of defect.

$$Y = V \quad (3)$$

When the user further selects "input with Lv" as the method of generating a threshold, the user inputs a value from 1 to 5, which are included in a range of levels of the preset threshold set, in the input field 1306. In response to this, the calculation unit 313 of the print inspection apparatus 120 calculates the other threshold and automatically displays the other threshold in the table 1301.

For example, reference character V represents an input value, and reference character N represents an integer obtained by dropping the fractional portion of the input value V. Reference character M represents an integer obtained by rounding up the fractional portion of the input value V, and reference character W represents the fractional portion of the input value V. Reference character Th(Lv, Sq) represents a density threshold corresponding to a plurality of size thresholds. In this case, reference character Lv represents an integer (1 to 5) corresponding to a preset threshold set. Reference character Sq represents an integer corresponding to a size threshold.

In the example in FIG. 6, Sq=1 corresponds to a size threshold (area threshold) of 16, Sq=2 corresponds to a size threshold (area threshold) of 64, Sq=3 corresponds to a size threshold (area threshold) of 256, Sq=4 corresponds to a size threshold (area threshold) of 1024, and Sq=5 corresponds to a size threshold (area threshold) of 4096.

Specific examples presented in FIG. 6 are as follows.

$$Th(1, 1) = 80$$

$$Th(2, 3) = 13$$

When a value of a threshold set to be newly generated is an integer equal to or greater than Lv=6 and reference character Lnew represents a threshold set Lv to be newly generated, the threshold set to be newly generated can be calculated using Equation (4) below.

$$Th(Lnew, Sq) = [Th(N, Sq) * (1 - W) + Th(M, Sq) * W] \text{ roundoff} \quad (4)$$

(Reference character roundoff is a function that rounds off the value in brackets [ ].)

As a specific example, when input value V=2.3 and Lnew=8 are established, N=2, M=3, and W=0.3 are established.

A threshold Th(8, 1) when Sq=1 is obtained as follows.

$$\begin{aligned} Th(8, 1) &= [50 * (1 - 0.3) + 30 * 0.3] \text{ roundoff} \\ &= 35 + 9 \\ &= 44 \end{aligned}$$

When selecting the "clear" button 1307, the user can delete the value displayed in the table 1304. When selecting the "reflect change" button 1308, the user can set the value displayed in the table 1304 to, for example, the dot-shaped defect detection threshold 600 as presented in FIG. 6.

In the background technique, for example, when it is desired to determine a defect having a small density difference and a large area, setting the density threshold to a small value leads to a disadvantage that a defect having a small density difference and a small area, which is not to be detected, is detected.

Moreover, when it is desired to determine a defect having a large density difference even with a small area, setting the threshold for the density difference to a large value leads to a disadvantage that a defect having a small density difference and a large area is not detected.

In contrast, for example, even when it is desired to determine a defect having a small density difference and a large area, the print inspection apparatus 120 according to the present embodiment can set a threshold set so as not to determine a defect having a small density difference and a small area. Similarly, even when it is desired to determine a defect having a large density difference even with a small area, the print inspection apparatus 120 can set a threshold set so as to detect a defect having a small density difference and a large area.

In general, it is difficult for the user to set such a threshold set. However, the print inspection apparatus 120 according to the present embodiment can easily set the threshold set using the custom threshold setting screen as illustrated in FIG. 13.

Second Embodiment

While the first embodiment has been described based on that the defect of the print is the dot-shaped defect, a second embodiment can handle linear defects such as a vertical linear defect and a lateral linear defect.

Figure 14:
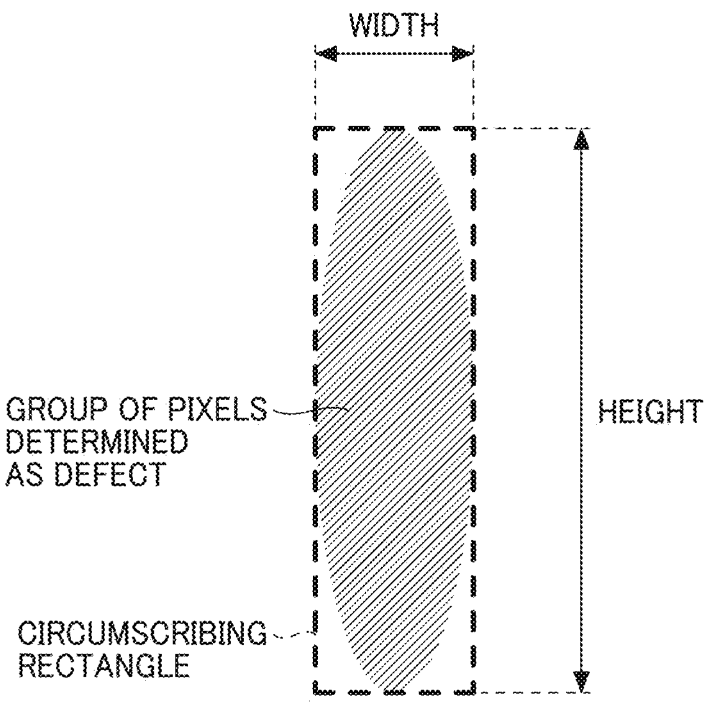
FIG. 14 is a diagram illustrating an aspect ratio according to a second embodiment of the present disclosure.

FIG. 14 is a diagram illustrating an aspect ratio according to the second embodiment of the present disclosure. In the second embodiment, as presented in FIG. 14, defect types are classified as follows using an aspect ratio R (height/width) of a circumscribing rectangle that circumscribes a group of pixels determined as a defect, and a predetermined numerical value A.

$$R > A\text{: vertical linear defect}$$

$$R < 1/A\text{: lateral linear defect}$$

$$1/A \le R \le A\text{: dot-shaped defect}$$

In this case, the predetermined numerical value A is set to a proper value in advance to classify a defect as a dot-shaped defect or a linear defect.

FIG. 15 is a table presenting an example of a linear defect detection threshold 1500 according to the second embodiment of the present disclosure. In the example in FIG. 15, the linear defect detection threshold 1500 includes a plurality of threshold sets 1501. The print inspection apparatus 120 according to the second embodiment stores, for example, the linear defect detection threshold 1500 as presented in FIG. 15 in advance in the storage unit 324 or the like in addition to the dot-shaped defect detection threshold 600 described with reference to FIG. 6. The linear defect detection threshold 1500 may be divided into a vertical linear defect detection threshold and a lateral linear defect detection threshold, or may be a linear defect detection threshold common to vertical and lateral linear defects.

The size threshold of the linear defect detection threshold 1500 is not the threshold for the area, but is the threshold for the length, which differs from the dot-shaped defect detection threshold 600. For example, in the case of a vertical linear defect, the size threshold is a threshold for the height (the length in the vertical direction) of a circumscribing rectangle that circumscribes a group of pixels determined as a defect using the density threshold. In the case of a lateral linear defect, the size threshold is a threshold for the width (the length in the lateral direction) of a circumscribing rectangle that circumscribes a group of pixels determined as a defect using the density threshold.

For example, when a threshold set Lv2 of the linear defect detection threshold 1500 presented in FIG. 15 is selected, and when the height of a group of adjacent pixels having a density difference of 50 or more is equal to or greater than a size threshold of 4 pixels, the group of adjacent pixels is determined as a defect. When the height of a group of adjacent pixels having a density difference of 7 or more is equal to or greater than a size threshold of 32 pixels, the group of adjacent pixels is determined as a defect.

Defect Determination Process

Figure 16:
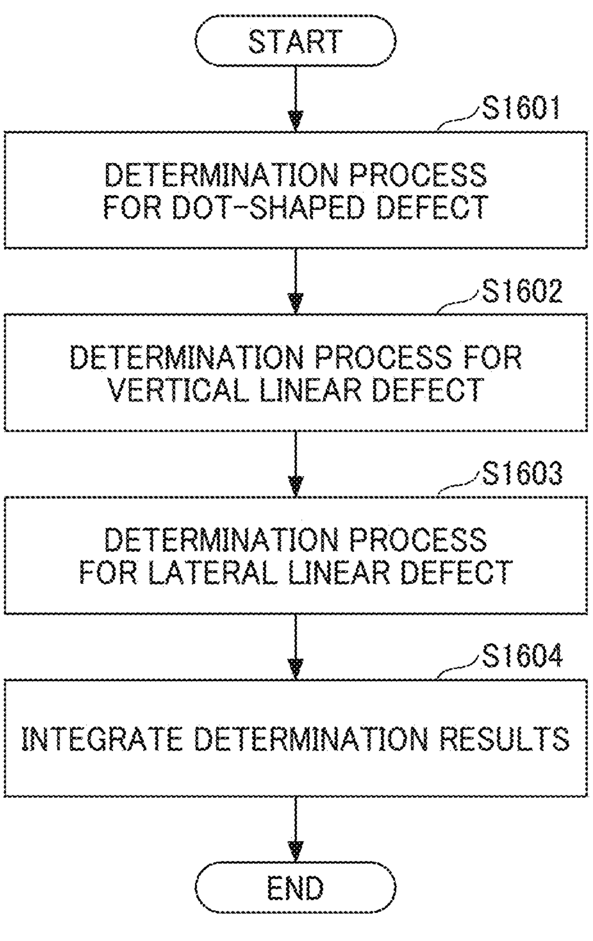
FIG. 16 is a flowchart presenting an example of a defect determination process according to the second embodiment of the present disclosure.

FIG. 16 is a flowchart presenting an example of a defect determination process according to the second embodiment of the present disclosure. This process represents an example of a defect determination process in which the print inspection apparatus 120 according to the second embodiment reads printed matter printed by the printer 110 and determines a defect of the print based on the read result.

In this case, it is assumed that the print inspection apparatus 120 stores the dot-shaped defect detection threshold 600, a vertical linear defect detection threshold, and a lateral linear defect detection threshold in the storage unit 324 in advance.

In step S1601, the print inspection apparatus 120 executes a determination process for a dot-shaped defect. For example, the print inspection apparatus 120 executes a defect determination process on a defect type basis as presented in FIG. 17 while setting a predetermined aspect ratio to "1/A≤R≤A".

Figure 17:
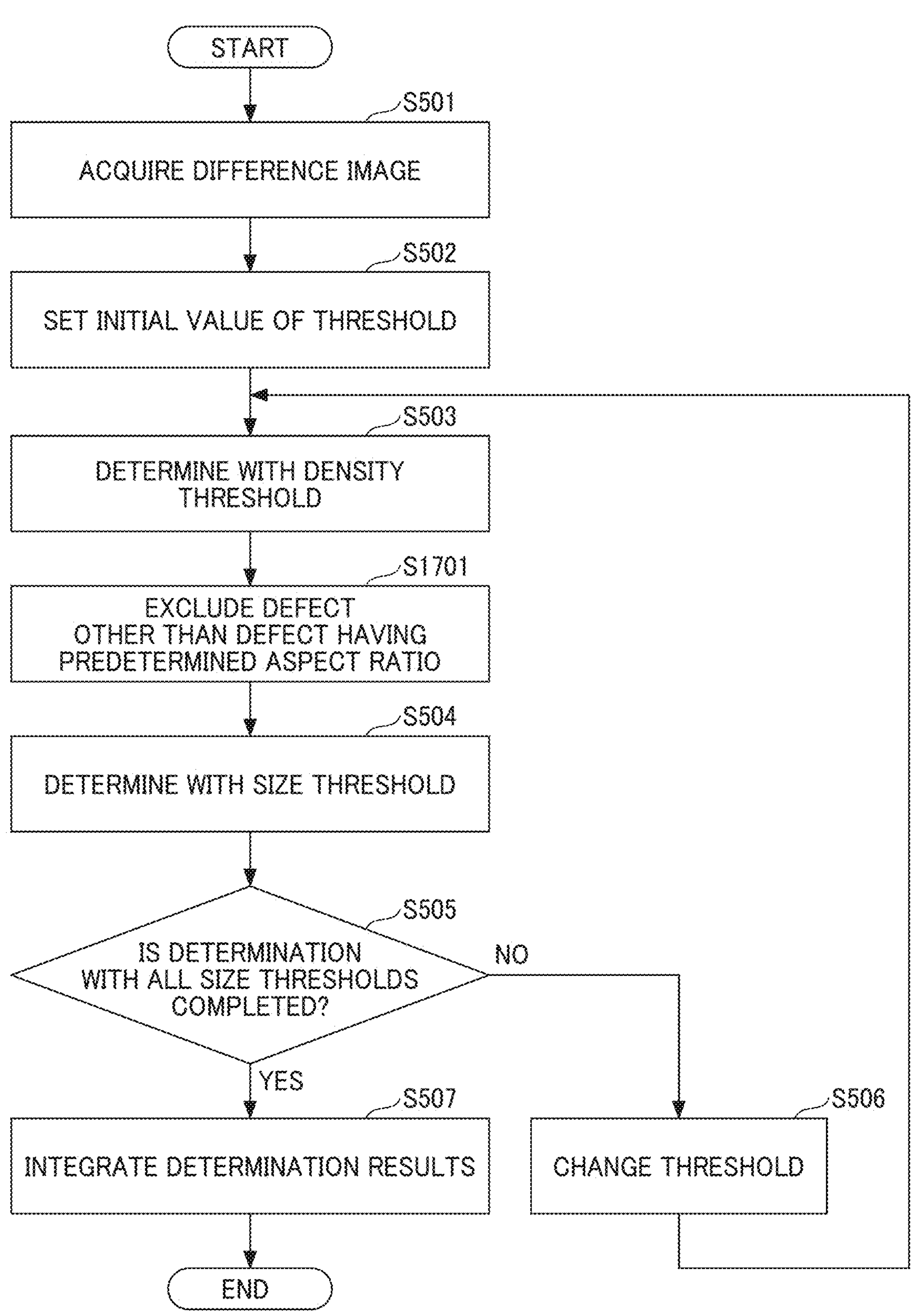
FIG. 17 is a flowchart presenting an example of a defect determination process on a defect type basis according to the second embodiment of the present disclosure.

FIG. 17 is a flowchart presenting an example of a defect determination process on a defect type basis according to the second embodiment of the present disclosure. This process is obtained by adding step S1701 to the defect determination process according to the first embodiment described with reference to FIG. 5. A detailed description on processing similar to that in the first embodiment is omitted.

In steps S501 to S503, the print inspection apparatus 120 performs defect determination with a density threshold on a difference image using the dot-shaped defect detection threshold 600 as presented in FIG. 6.

In step S1701, the defect inspection unit 312 of the print inspection apparatus 120 excludes a defect other than a defect having the predetermined aspect ratio of "1/A≤R≤A" from a group of adjacent pixels determined as a defect.

In step S504, the defect inspection unit 312 performs defect determination with a size threshold using the dot-shaped defect detection threshold 600. The processing in step S505 and later is similar to that in the first embodiment, and hence the description is omitted.

Referring back to FIG. 16, the description of the flowchart of the defect determination process is continued. In step S1602, the print inspection apparatus 120 executes a determination process for a vertical linear defect. For example, the print inspection apparatus 120 executes a defect determination process on a defect type basis as presented in FIG. 17 while setting the predetermined aspect ratio to "R>A".

For example, in steps S501 to S503 in FIG. 17, the print inspection apparatus 120 performs defect determination with a density threshold on the difference image using the vertical linear defect detection threshold stored in the storage unit 324 in advance. In step S1701, the defect inspection unit 312 excludes a defect other than a defect having the predetermined aspect ratio of "R>A" from the group of adjacent pixels determined as a defect. In step S504, the defect inspection unit 312 performs defect determination with a size threshold using the vertical linear defect detection threshold.

Referring back again to FIG. 16, the description of the flowchart of the defect determination process is further continued. In step S1603, the print inspection apparatus 120 executes a determination process for a lateral linear defect.

For example, the print inspection apparatus 120 executes a defect determination process on a defect type basis as presented in FIG. 17 while setting the predetermined aspect ratio to "R<1/A".

For example, in steps S501 to S503 in FIG. 17, the print inspection apparatus 120 performs defect determination with a density threshold on the difference image using the lateral linear defect detection threshold stored in the storage unit 324 in advance. In step S1701, the defect inspection unit 312 excludes a defect other than a defect having the predetermined aspect ratio of "R<1/A" from the group of adjacent pixels determined as a defect. The processing in step S504 is executed. In step S504, the defect inspection unit 312 performs defect determination with a size threshold using the lateral linear defect detection threshold.

In step S1604, the defect inspection unit 312 integrates the determination results of the defect determination in the processing from step S1601 to step S1603. For example, the defect inspection unit 312 determines the sum of defective areas of the determination results as a final defective area.

As described above, according to the second embodiment, a defect of printed matter can be inspected, for example, depending on the defect type, such as the dot-shaped defect, the vertical linear defect, or the lateral linear defect.

Threshold Confirmation Screen

Figure 18:
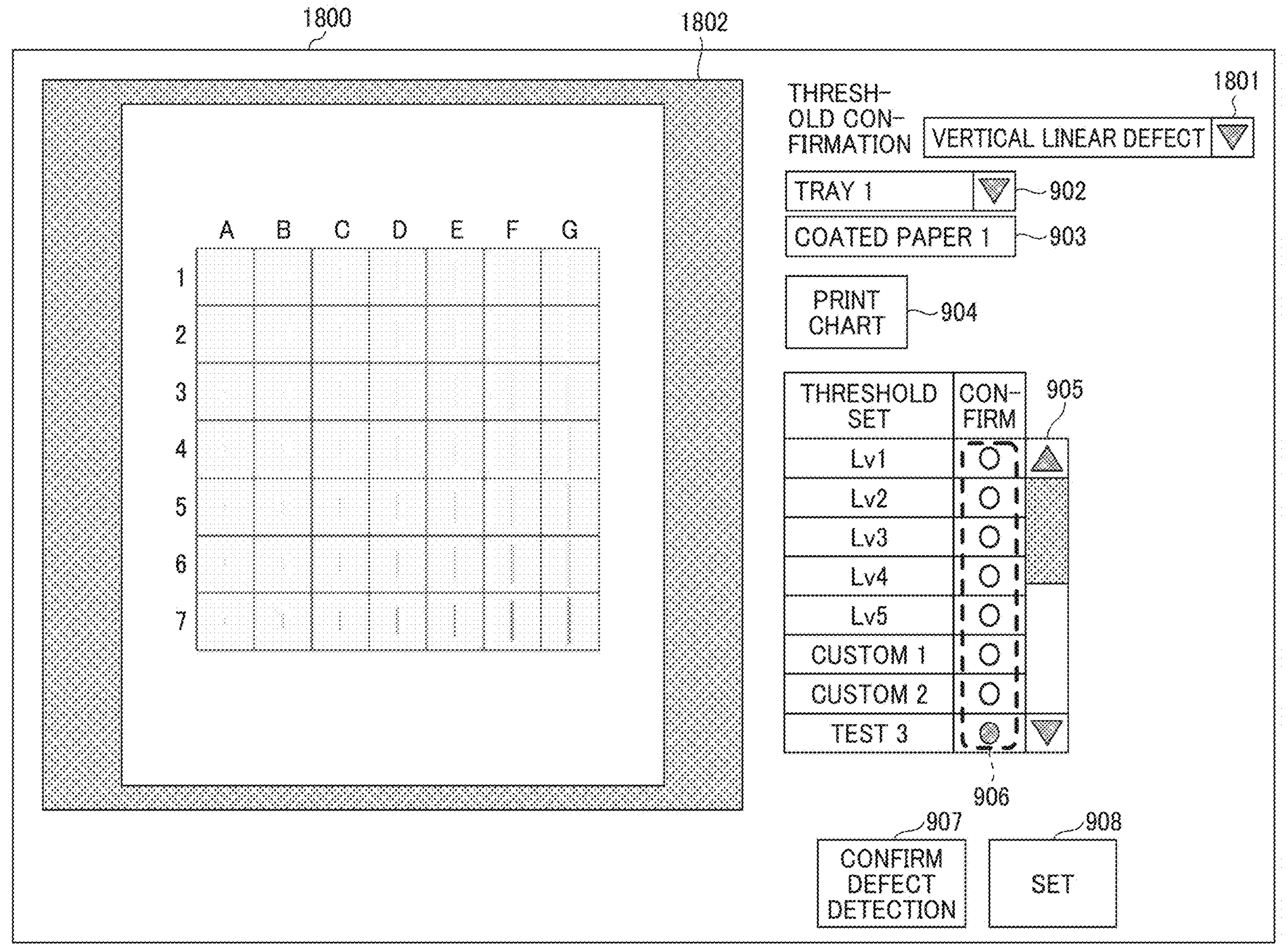
FIG. 18 is a view illustrating an example of a threshold confirmation screen according to the second embodiment of the present disclosure.

FIG. 18 is a view illustrating an example of a threshold confirmation screen 1800 according to the second embodiment of the present disclosure. As illustrated in FIG. 18, the threshold confirmation screen 1800 according to the second embodiment differs from the threshold confirmation screen 900 according to the first embodiment described with reference to FIG. 9 in that a selection field 1801 for selecting a defect type is added. The user can select the defect type, such as a dot-shaped defect, a vertical linear defect, or a lateral linear defect, from the selection field 1801 for selecting the defect type, and can display a confirmation screen 1802 corresponding to the defect type.

Figure 19:
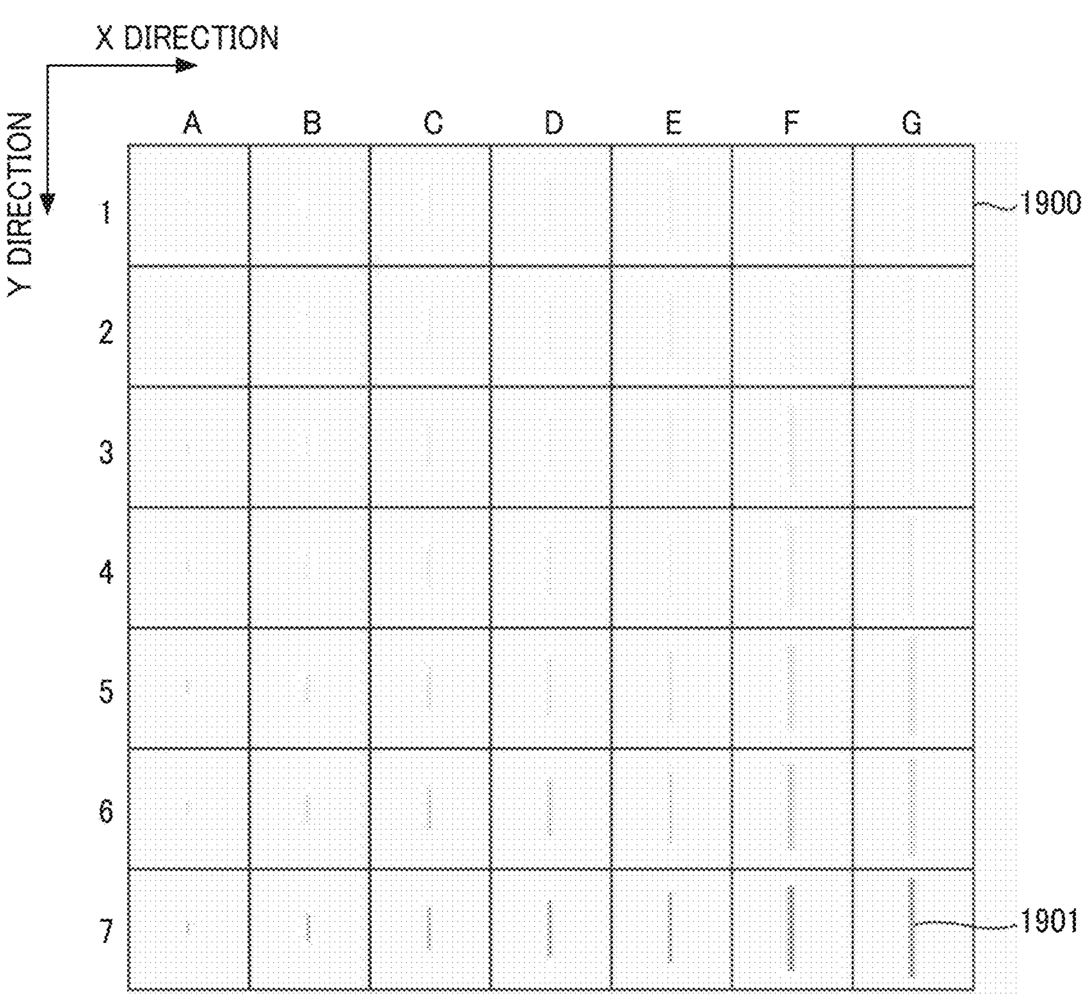
FIG. 19 is a diagram illustrating an example of a vertical linear defect test chart according to the second embodiment of the present disclosure.

FIG. 19 is a diagram illustrating an example of a vertical linear defect test chart 1900 according to the second embodiment of the present disclosure. The vertical linear defect test chart 1900 includes a plurality of defects 1901 arranged in an XY plane similarly to the dot-shaped defect test chart 1000. The plurality of defects are arranged so that the size or density of the defects varies in the X direction and the Y direction of the XY plane.

Referring to FIG. 19, 7×7 frames, numerals of 1 to 7, and characters of A to F represent document data, and vertical lines within the 7×7 frames represent the defects 1901. In the example in FIG. 19, the plurality of defects 1901 are arranged so that the height of the defect 1901 increases as the position advances in the X direction, and the density of the defect 1901 increases as the position advances in the Y direction.

In a lateral linear defect test chart, the defects 1901 of vertical lines in FIG. 19 are replaced with defects of lateral lines.

As described above, in the second embodiment, the thresholds for the dot-shaped defect, the vertical linear defect, and the lateral linear defect can be confirmed using the threshold confirmation screen 1800.

Custom Threshold Setting Screen

Figure 20:
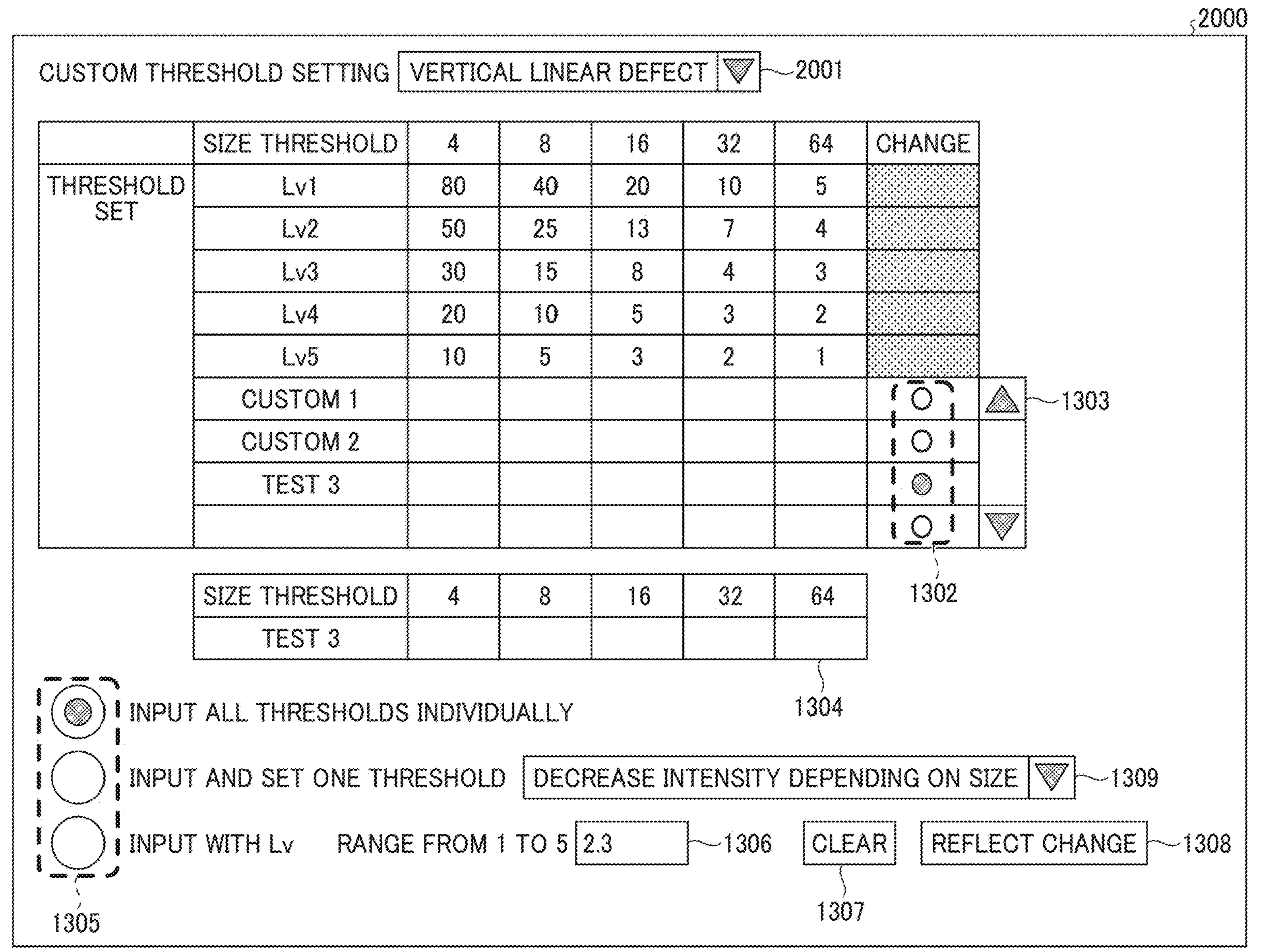
FIG. 20 is a view illustrating an example of a custom threshold setting screen according to the second embodiment of the present disclosure.

FIG. 20 is a view illustrating an example of a custom threshold setting screen 2000 according to the second embodiment of the present disclosure. As illustrated in FIG. 20, in the custom threshold setting screen 2000 according to the second embodiment, a selection field 2001 for selecting a defect type is added to the custom threshold setting screen 1300 according to the first embodiment described with reference to FIG. 13. The user selects, for example, a linear defect (for example, vertical linear defect) from the selection field 2001 for selecting a defect type to set a custom threshold in the linear defect detection threshold 1500 as presented in FIG. 15.

As described above, in the second embodiment, the custom thresholds for the dot-shaped defect, the vertical linear defect, and the lateral linear defect can be set using the custom threshold setting screen 2000.

Third Embodiment

Figure 21:
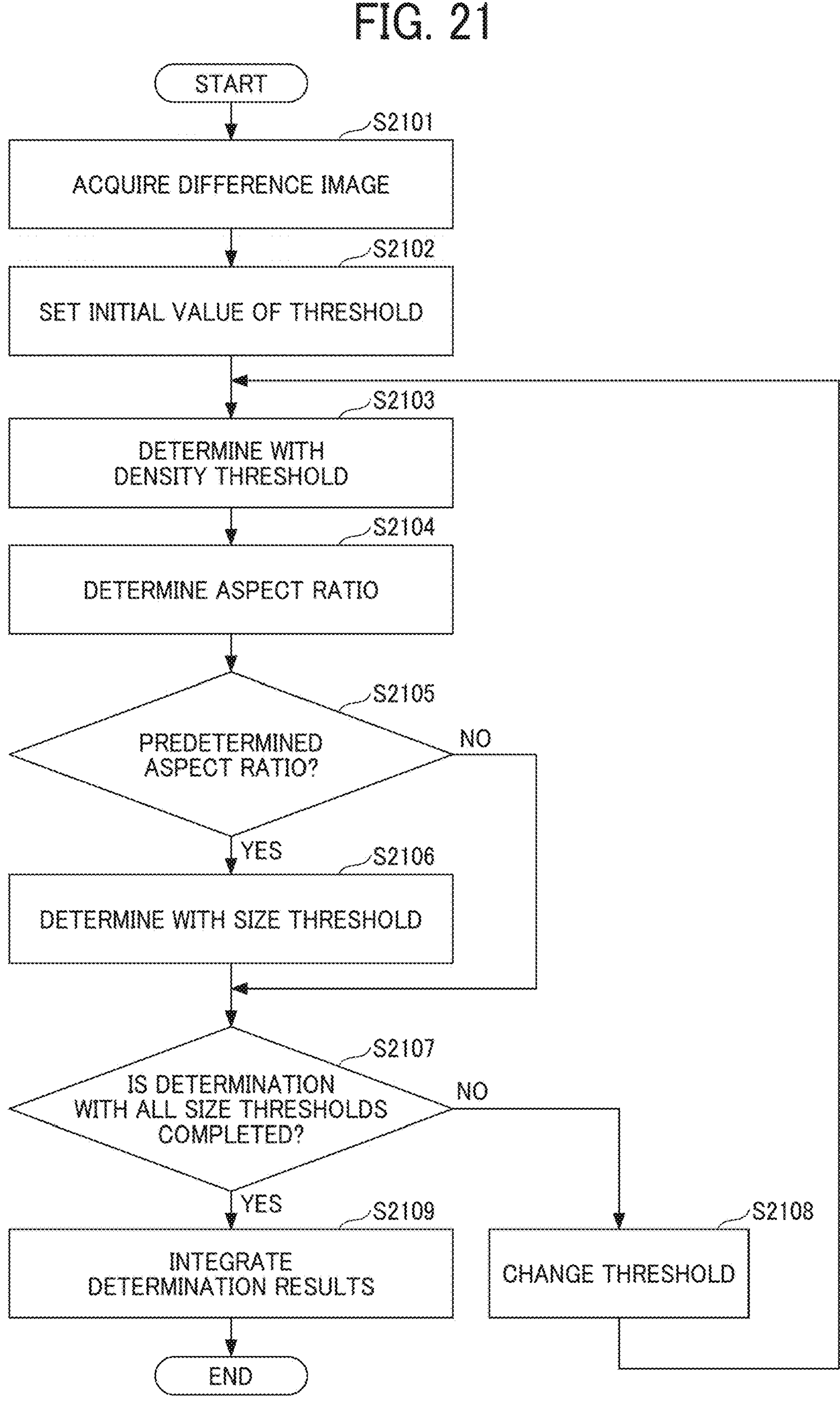
FIG. 21 is a flowchart presenting an example of a defect determination process according to a third embodiment of the present disclosure.

FIG. 21 is a flowchart presenting an example of a defect determination process according to a third embodiment of the present disclosure. This process represents another example of a defect determination process in which the print inspection apparatus 120 reads printed matter printed by the printer 110 and determines a defect of the print based on the read result. In this case, detailed description on processing content similar to that of the defect determination process according to the first embodiment described with reference to FIG. 6 is omitted.

In step S2101, the system control unit 310 of the print inspection apparatus 120 acquires a difference image from printed matter printed by the printer 110, and stores the acquired difference image in the storage unit 324 or the like.

In step S2102, the defect inspection unit 312 of the system control unit 310 sets an initial value of a threshold for defect determination. For example, the defect inspection unit 312 sets a minimum value of a size threshold and a density threshold corresponding to the size threshold.

In step S2103, the defect inspection unit 312 performs determination (defect determination) with the density threshold on the difference image. For example, the defect inspection unit 312 generates a binary image indicating "1" when any one of the RGB values of each pixel of the difference image is equal to or greater than the density threshold, and generates a binary image indicating "0" when all RGB values of each pixel of the difference image are smaller than the density threshold.

In step S2104, the defect inspection unit 312 determines an aspect ratio R of a circumscribing rectangle that circumscribes a group of adjacent pixels determined as a defect in step S2103.

In step S2105, it is determined whether the aspect ratio R is a predetermined aspect ratio. In this case, the predetermined aspect ratio includes predetermined aspect ratios presented below corresponding to the vertical linear defect, the lateral linear defect, and the dot-shaped defect described above in the second embodiment.

$$R > A\text{: vertical linear defect}$$

$$R < 1/A\text{: lateral linear defect}$$

$$1/A \leq R \leq A\text{: dot-shaped defect}$$

When the aspect ratio R is the predetermined aspect ratio, the defect inspection unit 312 advances the processing to step S2106. In contrast, when the aspect ratio R is not the predetermined aspect ratio, the defect inspection unit 312 advances the processing to step S2107.

In step S2106, the defect inspection unit 312 performs determination (defect determination) with the size threshold on the generated binary image. For example, the defect inspection unit 312 performs a labeling process on the generated binary image to set adjacent pixels having a pixel value of "1" as an object. When the size of the object (the number of pixels having the pixel value of "1" included in the object) is equal to or greater than the size threshold, the defect inspection unit 312 determines the object (or the pixels having the pixel value of "1" included in the object) as a defect.

In the case of the dot-shaped defect, comparison is made between the size threshold and the number of pixels of the group of pixels. In the case of the vertical linear defect, comparison is made between the size threshold and the height of the circumscribing rectangle of the group of pixels. In the case of the lateral linear defect, comparison is made between the size threshold and the width of the circumscribing rectangle of the group of pixels.

In step S2107, the defect inspection unit 312 determines whether the determination with all size thresholds is completed. When the determination with all size thresholds is not completed, the defect inspection unit 312 advances the processing to step S2108. In contrast, when the determination with all size thresholds is completed, the defect inspection unit 312 advances the processing to step S2109.

In step S2108, the defect inspection unit 312 changes the threshold. For example, the defect inspection unit 312 changes the size threshold to a next greater threshold, and sets a threshold for the density difference corresponding to the changed size threshold. The defect inspection unit 312 returns the processing to step S2103.

In step S2109, the defect inspection unit 312 integrates the determination results of the defect determination in the processing from step S2103 to step S2108. For example, the defect inspection unit 312 determines the sum of defective areas of the determination results as a final defective area.

As described above, the specific flow of the processing of the defect determination process according to the present embodiment can be modified and applied in various ways.

As described above, according to any of the embodiments of the present disclosure, the print inspection apparatus that inspects a defect of printed matter printed by the printer can reduce defects that are not detectable.

Each of the functions of the described embodiments can be implemented by one or more processing circuits or circuitry. As used herein, the term "processing circuit or circuitry" includes processors programmed to implement each function by software, such as a processor implemented by an electronic circuit, and devices designed to implement the functions described above, such as an application specific integrated circuit (ASIC), a digital signal processor (DSP), a field programmable gate array (FPGA), and existing circuit modules.

The functional configuration of the print system 1 illustrated in FIG. 3 is an example. For example, referring to FIG. 3, at least part of the functional configurations included in the printer 110 may be included in a print inspection apparatus. At least part of the functional configurations included in the print inspection apparatus 120 may be included in a printer. Furthermore, the printer 110 and the print inspection apparatus 120 may be an apparatus (print inspection apparatus).

The present specification discloses a print inspection apparatus, a print system, a print inspection method, and a program in the following aspects.

Aspect 1

In Aspect 1, a print inspection apparatus includes a difference image generation unit that generates a difference image between a read image obtained by reading printed matter printed by a printer and a reference image to be compared with the read image; and a defect inspection unit that inspects a defect of the print matter using the difference image, a plurality of size thresholds, and a plurality of density thresholds corresponding to each of the plurality of size thresholds.

Aspect 2

According to Aspect 2, in the print inspection apparatus of Aspect 1, the defect inspection unit further performs defect determination using the plurality of size thresholds on a defect determined using the plurality of density thresholds.

Aspect 3

According to Aspect 3, in the print inspection apparatus of Aspect 1 or Aspect 2, the defect inspection unit inspects the defect of the printed matter based on a sum of defective pixels determined as defects using the plurality of density thresholds and the plurality of size thresholds.

Aspect 4

According to Aspect 4, in the print inspection apparatus of any one of Aspect 1 to Aspect 3, the plurality of density thresholds vary depending on the corresponding size thresholds.

Aspect 5

According to Aspect 5, in the print inspection apparatus of any one of Aspect 1 to Aspect 4, the print inspection apparatus includes a plurality of threshold sets each of which includes a combination of the plurality of density thresholds and the plurality of size thresholds.

Aspect 6

According to Aspect 6, the print inspection apparatus of Aspect 5 further includes a display control unit that causes a display unit to display a user interface screen to select one threshold set from the plurality of threshold sets.

Aspect 7

According to Aspect 7, the print inspection apparatus of Aspect 6 further includes a confirmation control unit that controls printing of a test chart including a plurality of defects, and that generates a confirmation image to confirm a defect that is determined using the one threshold set among the plurality of defects. The display control unit displays the confirmation image on the user interface screen.

Aspect 8

According to Aspect 8, in the print inspection apparatus of Aspect 7, the test chart includes the plurality of defects arranged in an XY plane. The plurality of defects are arranged to have sizes or densities varying in an X direction and a Y direction of the XY plane.

Aspect 9

According to Aspect 9, the print inspection apparatus of Aspect 5 further includes a display control unit that causes a display unit to display a setting screen to set the threshold sets.

Aspect 10

According to Aspect 10, in the print inspection apparatus of Aspect 9, the setting screen includes an input field to input the plurality of density thresholds corresponding to each of the plurality of size thresholds.

Aspect 11

According to Aspect 11, in the print inspection apparatus of Aspect 9, the setting screen receives an input of a density threshold corresponding to one size threshold among the plurality of size thresholds. The print inspection apparatus further includes a calculation unit that calculates a density threshold corresponding to another size threshold based on the density threshold corresponding to the one size threshold.

Aspect 12

According to Aspect 12, in the print inspection apparatus of Aspect 11, the calculation unit calculates the density threshold corresponding to said another size threshold using a predetermined function.

Aspect 13

According to Aspect 13, in the print inspection apparatus of Aspect 12, the setting screen includes a selection field to select the predetermined function.

Aspect 14

According to Aspect 14, the print inspection apparatus of any one of Aspect 9 to Aspect 13 includes the calculation unit that calculates a new threshold set based on two existing threshold sets in a case where the threshold sets are set.

Aspect 15

According to Aspect 15, in the print inspection apparatus of Aspect 2, the defect determination includes determination for a dot-shaped defect of the print. The print inspection apparatus includes a combination of the plurality of density thresholds and the plurality of size thresholds to determine the dot-shaped defect.

Aspect 16

According to Aspect 16, in the print inspection apparatus of Aspect 15, the defect determination further includes inspection for a linear defect of the print. The print inspection apparatus includes a combination of the plurality of density thresholds and the plurality of size thresholds to determine the linear defect.

Aspect 17

According to Aspect 17, in the print inspection apparatus of Aspect 16, the linear defect includes a vertical linear defect and a lateral linear defect. The print inspection apparatus includes a combination of the plurality of density thresholds and the plurality of size thresholds to determine the vertical linear defect, and a combination of the plurality of density thresholds and the plurality of size thresholds to determine the lateral linear defect.

Aspect 18

In Aspect 18, a print system includes a difference image generation unit that generates a difference image between a read image obtained by reading printed matter printed by a printer and a reference image to be compared with the read image; and a defect inspection unit that inspects a defect of the print using the difference image, a plurality of size thresholds, and a plurality of density thresholds corresponding to each of the plurality of size thresholds.

Aspect 19

In Aspect 19, a print inspection method that is executed by a computer includes generating a difference image between a read image obtained by reading printed matter printed by a printer and a reference image to be compared with the read image; and inspecting a defect of the print using the difference image, a plurality of size thresholds, and a plurality of density thresholds corresponding to each of the plurality of size thresholds.

Aspect 20

In Aspect 20, a program causes a computer to execute the print inspection method of Aspect 19.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A print inspection apparatus comprising:

circuitry configured to:

generate a difference image based on a comparison between a read image obtained by reading printed matter printed by a printer and a reference image, and inspect a defect of the printed matter using the difference image, a plurality of size thresholds, and a plurality of density thresholds corresponding to each of the plurality of size thresholds; and a memory that stores a plurality of threshold sets each including a combination of the plurality of density thresholds and the plurality of size thresholds, wherein:

the circuitry is further configured to cause a display to display a setting screen to set the threshold sets, and the setting screen includes an input field to input the plurality of density thresholds corresponding to each of the plurality of size thresholds.

2. The print inspection apparatus according to claim 1, wherein:

the circuitry is further configured to determine a defect of the printed matter using the plurality of density thresholds, and further determine whether the defect having been determined using the plurality of density thresholds is a defect using the plurality of size thresholds.

3. The print inspection apparatus according to claim 1, wherein;

the circuitry is further configured to inspect the defect of the printed matter based on a sum of defective pixels determined as defects using the plurality of density thresholds and the plurality of size thresholds.

4. The print inspection apparatus according to claim 1, wherein:

the plurality of density thresholds vary depending on the corresponding size thresholds.

5. The print inspection apparatus according to claim 1, wherein:

the circuitry is further configured to display, on a display, a user interface screen for selecting one threshold set from the plurality of threshold sets.

6. The print inspection apparatus according to claim 5, wherein the circuitry is further configured to:

control printing of a test chart including a plurality of defects, generate a confirmation image to confirm a defect that is determined using the one threshold set among the plurality of defects, and display the confirmation image on the user interface screen.

7. The print inspection apparatus according to claim 6, wherein;

the test chart includes the plurality of defects arranged in an XY plane, and the plurality of defects are arranged to have sizes or densities varying in an X direction and a Y direction of the XY plane.

8. The print inspection apparatus according to claim 1, wherein the circuitry is further configured to;

receive an input of a density threshold corresponding to one size threshold among the plurality of size thresholds via the setting screen, and calculate a density threshold corresponding to another size threshold based on the density threshold corresponding to the one size threshold.

9. The print inspection apparatus according to claim 8, wherein;

the circuitry is further configured to calculate the density threshold corresponding to said another size threshold using a predetermined function.

10. The print inspection apparatus according to claim 9, wherein;

the setting screen includes a selection field to select the predetermined function.

11. The print inspection apparatus according to claim 1, wherein:

the circuitry is further configured to calculate a new threshold set based on two existing threshold sets in a case where the threshold sets are set.

12. The print inspection apparatus according to claim 2, wherein;

the circuitry determines, as the defect, a dot-shaped defect of the printed matter, and the plurality of density thresholds and the plurality of size thresholds include a combination of the plurality of density thresholds and the plurality of size thresholds to determine the dot-shaped defect.

13. The print inspection apparatus according to claim 2, wherein;

the circuitry determines, as the defect, a linear defect of the printed matter, and the plurality of density thresholds and the plurality of size thresholds include a combination of the plurality of density thresholds and the plurality of size thresholds to determine the linear defect.

14. The print inspection apparatus according to claim 13, wherein;

the linear defect includes a vertical linear defect and a lateral linear defect, and the plurality of density thresholds and the plurality of size thresholds include a combination of the plurality of density thresholds and the plurality of size thresholds to determine the vertical linear defect, and a combination of the plurality of density thresholds and the plurality of size thresholds to determine the lateral linear defect.

15. A print inspection apparatus comprising:

circuitry configured to:

generate a difference image based on a comparison between a read image obtained by reading printed matter printed by a printer and a reference image, and inspect a defect of the printed matter using the difference image, a plurality of size thresholds, and a plurality of density thresholds corresponding to each of the plurality of size thresholds; and a memory that stores a plurality of threshold sets each including a combination of the plurality of density thresholds and the plurality of size thresholds, wherein:

the circuitry is further configured to cause a display to display a setting screen to set the threshold sets, and the circuitry is further configured to:

receive an input of a density threshold corresponding to one size threshold among the plurality of size thresholds via the setting screen, and calculate a density threshold corresponding to another size threshold based on the density threshold corresponding to the one size threshold.

16. A print inspection apparatus comprising:

circuitry configured to:

generate a difference image based on a comparison between a read image obtained by reading printed matter printed by a printer and a reference image, and inspect a defect of the printed matter using the difference image, a plurality of size thresholds, and a plurality of density thresholds corresponding to each of the plurality of size thresholds; and a memory that stores a plurality of threshold sets each including a combination of the plurality of density thresholds and the plurality of size thresholds, wherein:

the circuitry is further configured to cause a display to display a setting screen to set the threshold sets, and the circuitry is further configured to calculate a new threshold set based on two existing threshold sets in a case where the threshold sets are set.

17. A print inspection apparatus, comprising:

circuitry configured to:

generate a difference image based on a comparison between a read image obtained by reading printed matter printed by a printer and a reference image, inspect a defect of the printed matter using the difference image, a plurality of size thresholds, and a plurality of density thresholds corresponding to each of the plurality of size thresholds, determine a defect of the printed matter using the plurality of density thresholds, and further determine whether the defect having been determined using the plurality of density thresholds is a defect using the plurality of size thresholds, and determine, as the defect, a linear defect of the printed matter, wherein:

the plurality of density thresholds and the plurality of size thresholds include a combination of the plurality of density thresholds and the plurality of size thresholds to determine the linear defect, the linear defect includes a vertical linear defect and a lateral linear defect, and the plurality of density thresholds and the plurality of size thresholds include a combination of the plurality of density thresholds and the plurality of size thresholds to determine the vertical linear defect, and a combination of the plurality of density thresholds and the plurality of size thresholds to determine the lateral linear defect.

* * * * *